(12) United States Patent
Tokunaga

(10) Patent No.: US 7,102,675 B1
(45) Date of Patent: Sep. 5, 2006

(54) PHOTOELECTRIC CONVERSION DEVICE, FOCUS DETECTION DEVICE, METHOD OF CONTROLLING THESE DEVICES, AND STORAGE MEDIUM

(75) Inventor: Tatsuyuki Tokunaga, Yono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/189,010

(22) Filed: Nov. 9, 1998

(30) Foreign Application Priority Data

Nov. 14, 1997 (JP) ................... 9-313432
Jan. 20, 1998 (JP) ................. 10-009064

(51) Int. Cl.
*H04N 5/335* (2006.01)
*H04N 5/232* (2006.01)
*G03B 3/00* (2006.01)

(52) U.S. Cl. ............... 348/297; 348/350; 396/96
(58) Field of Classification Search ........... 348/297, 348/301, 362, 247, 302, 350; 396/96, 128, 396/225
See application file for complete search history.

(56) References Cited

U.S. PATENT DOCUMENTS

| 4,573,077 | A | * | 2/1986 | Imai ..................... 348/307 |
| 4,635,126 | A | * | 1/1987 | Kinoshita ............. 348/297 |
| 4,706,123 | A |   | 11/1987 | Chautemps |
| 5,182,658 | A | * | 1/1993 | Ishizaki et al. ........ 348/297 |
| 5,489,772 | A | * | 2/1996 | Webb et al. ............ 348/297 |
| 5,497,215 | A | * | 3/1996 | Iwasaki ................ 396/225 |
| 5,572,280 | A | * | 11/1996 | Yaji et al. ............. 396/96 |
| 5,615,399 | A | * | 3/1997 | Akashi et al. ......... 396/128 |
| 5,767,903 | A | * | 6/1998 | Kawamura et al. ..... 348/297 |
| 5,883,830 | A | * | 3/1999 | Hirt et al. ............ 365/185.03 |
| 5,943,514 | A | * | 8/1999 | Sato et al. ............. 396/96 |
| 6,229,133 | B1 | * | 5/2001 | Hynecek .............. 250/208.1 |
| 6,243,136 | B1 | * | 6/2001 | Sasaki ................. 348/362 |
| 6,396,539 | B1 | * | 5/2002 | Heller et al. ......... 348/246 |
| 6,665,010 | B1 | * | 12/2003 | Morris et al. ......... 348/297 |

FOREIGN PATENT DOCUMENTS

| JP | 61-236283 | 10/1986 |
| JP | 02-036682 | 2/1990 |

\* cited by examiner

*Primary Examiner*—Lin Ye
(74) *Attorney, Agent, or Firm*—Morgan & Finnegan, L.L.P.

(57) ABSTRACT

An object of this invention is to provide a photoelectric conversion device which can always appropriately perform charge accumulation independently of the luminance levels of objects, can read out an image signal by effectively using the dynamic range, can attain accurate auto-focus, and can realize them at low cost without increasing the circuit scale. In order to achieve this object, a memory is provided for each photoelectric conversion element, and a controller controls charge accumulation of the photoelectric conversion element on the basis of control information read out from the memory.

13 Claims, 21 Drawing Sheets

PHOTOELECTRIC CONVERSION DEVICE, FOCUS DETECTION DEVICE, METHOD OF CONTROLLING THESE DEVICES, AND STORAGE MEDIUM

BACKGROUND OF THE INVENTION

The present invention relates to a photoelectric conversion device applied to photographing equipment such as a still camera, video camera, and the like, various observation apparatuses, and the like, its control method, a focus detection device, and a storage medium which computer-readably stores processing steps of implementing the control method of the photoelectric conversion device and focus detection device.

Conventionally, various types of so-called auto-focus (AF) cameras, which detect the focus state of an object, and automatically focus on the object by changing the moving distance of the photographing lens in correspondence with the detected focus state, have been proposed.

Such AF cameras and the like use the method of detecting the focus state by, e.g., forming an object image on a photoelectric conversion element (to be referred to as a sensor hereinafter) formed by a plurality of photoelectric conversion pixels (to be simply referred to as pixels hereinafter), and performing predetermined arithmetic processing for a plurality of pixel signals output from the sensor.

In this method, in order to accurately detect the focus states of objects having various luminance levels (e.g., from a high-luminance object to low-luminance one), the amplification factor (to be referred to as a gain hereinafter) upon reading signals, and the charge accumulation time of the sensor must be appropriately controlled.

This is because if the level of an image signal of an object formed by a plurality of pixel signals (to be referred to as a video signal hereinafter) is too high, it exceeds the dynamic range of a pixel signal that can be processed by the apparatus, and the video signal becomes different from an actual one, thus impairing precision. By contrast, if the level of the video signal is too low, noise components increase relatively, and may impair precision.

FIG. 8 shows a photoelectric converter 500 which controls the read gain of pixel signals and the charge accumulation time in a sensor 54.

This photoelectric converter 500 comprises a sensor 54 constructed by a plurality of pixels, a peak detection circuit 53 for detecting and outputting a maximum accumulated charge amount during charge accumulation on the sensor 54, a memory 52 for receiving and holding pixel signals upon completion of charge accumulation on the sensor 54, a counter 55, a level output circuit 56 for outputting a level value selected from a plurality of level values in accordance with the count value of the counter 55, a comparator 57 for comparing the outputs from the level output circuit 56 and peak detection circuit 53, and outputting the comparison result, and a read amplifier 58 for outputting the pixel signals held in the memory 52 with the gain corresponding to the count value of the counter 55.

Note that the respective units of the photoelectric converter 500 are controlled by a controller 51, which especially controls charge accumulation on the sensor 54.

More specifically, as shown in FIG. 9, the controller 51 outputs a reset signal rst to the sensor 54 and counter 55 (step S501).

In response to this signal, charges on all the pixels of the sensor 54 are initialized, and the counter 55 is reset to an initial value "0" (count=0).

After that, charge accumulation on the sensor 54 is actually started.

Subsequently, the controller 51 sets its internal timer at an initial value "0" (timer=0), thus starting time measurement of the charge accumulation (step S502).

The controller 51 checks if the timer value timer of the internal timer has exceeded a maximum accumulation time Etime (step S503).

If "timer≧Etime", the controller 51 determines the end of charge accumulation, and outputs a signal trans indicating this to the sensor 54. In response to this signal, charges accumulated on the individual pixels of the sensor 54 are transferred as pixel signals to the memory 52, thus ending charge accumulation on the sensor 54 (step S508).

On the other hand, if "timer<Etime" in step S503, the controller 51 checks if an output signal comp from the comparator 57 is "1", i.e., if an output signal c_level of the level output circuit 56 is larger than an output signal p_out of the peak detection circuit 53 (step S504).

If "comp≠1", the flow returns to step S503 to repeat the subsequent processing steps.

Note that the output signal c_level of the level output circuit 56 will be described in detail later.

If "comp=1" in step S504, the controller 51 checks if the internal timer value timer has exceeded an intermediate accumulation time Htime (step S505).

As a result of checking, if "timer≧Htime", the flow advances to step S508, thus ending charge accumulation on the sensor 54.

However, if "timer<Htime" in step S505, the controller 51 checks if the count value count of the counter 55 is "3" (step S506).

If "count=3", the flow advances to step S508, thus ending charge accumulation on the sensor 54.

On the other hand, if "count≠3" in step S506, the controller 51 outputs a signal up_c to the counter 55. In response to this signal, the count value count of the counter 55 is counted up (step S507).

After that, the flow returns to step S503 to repeat the subsequent processing steps.

Charge accumulation control of the sensor 54 is done in this way, and the read of pixel signals held in the memory 52 after completion of charge accumulation is controlled by a signal shift output from the controller 51.

With this control, pixel signals s_out read out from the memory 52 are multiplied by the gain by the read amplifier 58, and are output from an output terminal Vout.

At this time, the read amplifier 58 multiplies the pixel signals s_out from the memory 52 by the gain in accordance with the count value count of the counter 55.

The charge accumulation time of the sensor 54 is controlled by switching the output signal c_level of the level output circuit 56.

The charge accumulation time and the output signal c_level of the level output circuit 56 will be described below with reference to FIGS. 10A and 10B.

In the following description, assume that the level output circuit 56 has four level values "level1.0" to "level1.3", and selectively outputs one of these level values in accordance with the count value count of the counter 55.

In FIGS. 10A and 10B, the abscissa plots the charge accumulation time, and the ordinate plots the values of the output signal c_level of the level output circuit 56 and the output signal p_out of the peak detection circuit 53.

FIG. 10A shows a case wherein the object is relatively bright, and the peak output of each pixel signal, i.e., the output signal p_out of the peak detection circuit 53 rises quickly. FIG. 10B shows, contrary to FIG. 10A, a case wherein the object is relatively dark, and the peak output of each pixel signal rises slowly.

(Case of FIG. 10A)

When charge accumulation is started, since the count value count of the counter 55 is initialized (step S501), the output signal c_level of the level output circuit 56 changes to "level1.0".

When the charge accumulation time (timer value timer of the internal timer) has reached "A-1", the output signal p_out of the peak detection circuit 53 exceeds the output signal c_level of the level output circuit 56. As a result, when the output signal comp of the comparator becomes "1", the count value count of the counter 55 is counted up (steps S503 to S507). Since the counted-up count value count is supplied to the level output circuit 56, the output signal c_level of the level output circuit 56 changes to "level1.1".

Similarly, when the charge accumulation time has reached "A-2", the count value count of the counter 55 is counted up, and the output signal c_level of the level output circuit 56 changes to "level1.2".

Also, when the charge accumulation time has reached "A-3", the count value count of the counter 55 is counted up, and the output signal c_level of the level output circuit 56 changes to "level1.3".

When the charge accumulation time has reached "A-4", since the count value count of the counter 55 is "3", charge accumulation on the sensor 54 ends (the flow advances to step S508 as a result of checking in step S506).

(Case of FIG. 10B)

When the charge accumulation time has reached "B-1" and "B-2", the count value count of the counter 55 is counted up, and the output signal c_level of the level output circuit 56 changes from "level1.0" to "level1.1" and from "level1.1" to "level1.2", in the same manner as in "A-1" to "A-3" mentioned above.

When the charge accumulation time has reached "B-3", if it has exceeded the intermediate accumulation time due to the slowly rising output signal p_out of the peak detection circuit 53, charge accumulation on the sensor 54 ends (the flow advances to step S508 as a result of checking in step S506).

In this way, by switching the output signal c_level of the level output circuit 56 among four levels, the charge accumulation time is controlled in correspondence with the object condition, e.g., so that a sufficiently long charge accumulation time is assured when the object is light, or the charge accumulation time is prevented from becoming excessively long when the object is dark.

The gain of the read amplifier 58 is controlled in accordance with the count value count of the counter 55, and as a consequence, since the gain of the read amplifier 58 is controlled in accordance with the peak output (p_out) of each pixel signal, pixel signals can always be read out while effectively using the dynamic range of pixel signals that can be processed by the apparatus.

However, when the aforementioned conventional photoelectric converter 500 is applied to a multi-point AF camera which can effect the AF function at a plurality of distance measurement points, the arrangement including the comparator 57 and the like shown in FIG. 8 must be provided for each of all the distance measurement points. As a result, the circuit scale becomes huge, and the area of an IC chip increases.

In order to solve such problem, a method of dividing a single sensor into regions in units of distance measurement points, and controlling the charge accumulation time by a single controller while sequentially scanning the respective regions is proposed.

With this method, multi-point AF can be realized by a reasonable chip size while suppressing an increase in IC chip area.

However, in this method, when a pixel signal is read out from each region and is then compared to control the charge accumulation time of the region (sensor) of each distance measurement point, it is intermittently checked for a certain region during charge accumulation if charge accumulation is to end.

When such method is used in the photoelectric converter 500 shown in FIG. 8, since the output signal c_level of the level output circuit 56 is "level1.0" immediately after the beginning of charge accumulation, the count value count of the counter 55 becomes "3" for a high-luminance object which makes the output signal p_out of the peak detection circuit 53 rise rapidly, and charge accumulation ends. For this reason, much time is required, and the charge accumulation time cannot be appropriately controlled. As a result, since the level of the video signal of an object exceeds the dynamic range, the obtained image may be distorted. Also, in recent AF cameras, since the number of points for detecting the focus state (to be referred to as distance measurement points hereinafter) in the frame gradually is increasing like 3, 4, 5, . . . , the photographer need not change framing upon photographing after he or she sets a principal object in the frame at each distance measurement point and then focuses on the principal object, thus improving operability.

In order to further improve operability, the number of distance measurement points is preferably increased.

On the other hand, the focus state at each distance measurement point is detected by forming an object image on a photoelectric conversion device (to be referred to as a sensor hereinafter) formed by a plurality of pixels, and arithmetically processing pixel signals output from the sensor. In such case, more accurate focus detection can be attained with increasing level of an image signal defined by the pixel signals. However, when the level of the image signal is too high and exceeds the dynamic range that can process pixel signals, the image signal becomes different from an actual one, thus impairing precision.

Hence, it is a common practice to use an accumulation sensor, and to appropriately control its accumulation time.

When there are a plurality of distance measurement points, the accumulation time of a region corresponding to each distance measurement point is independently controlled. A circuit for appropriately controlling the accumulation time has a large scale, and when the number of distance measurement points is increased, the circuit scale of the sensor including a control circuit is huge. To prevent such problem, the present applicant has proposed a method of controlling the accumulation time using a single controller while dividing a photoelectric conversion element into regions in units of distance measurement points, and sequentially scanning the regions.

However, with this method, since scanning is done all the time during accumulation, many noise components are produced, thus impairing precision. Also, the consumption currents increase, thus wasting energy.

This problem can be solved by slow scanning. However, upon focus detection for a high-luminance object image, the image signal may exceed the dynamic range while scanning in units of regions, and precision may be impaired. Hence, it is hard to attain a small circuit scale and accurate focus detection at the same time.

SUMMARY OF THE INVENTION

The present invention has been made in consideration of the above-mentioned problems, and has as its object to provide a photoelectric conversion device which can always perform charge accumulation control independently of the object types to read pixel signals by effectively using the dynamic range, can attain accurate auto-focus, and can realize them without increasing the circuit scale and cost, its control method, a focus detection device, and a storage medium which computer-readably stores processing steps of implementing the control method of the photoelectric conversion device.

It is another object of the present invention to provide a low-cost, precise photoelectric conversion device and focus detection device, their control method, and a storage medium.

In order to solve the above-mentioned problems and to achieve the objects, the first aspect of a photoelectric conversion device according to the present invention is characterized by the following arrangement.

That is, photoelectric conversion device comprising:

photoelectric conversion means including a photoelectric conversion element constructed by a plurality of pixels on a semiconductor substrate; and storage means for storing predetermined control information arranged on the same semiconductor substrate.

The second aspect of a photoelectric conversion device according to the present invention is characterized by the following arrangement.

That is, a photoelectric conversion device comprises photoelectric conversion means including a photoelectric conversion element constructed by a plurality of pixels, and storage means for storing predetermined control information, read means for amplifying an accumulated charge signal of the photoelectric conversion element with a predetermined amplification factor, and reading out the amplified signal, and control means for controlling the amplification factor of the read means on the basis of the control information stored in the storage means.

The first aspect of a method of controlling a photoelectric conversion device according to the present invention is characterized by the following arrangement.

That is, a method of controlling charge accumulation of a photoelectric conversion element constructed by a plurality of pixels, comprises the control step of reading out control information from a memory corresponding to the photoelectric conversion element, and controlling the charge accumulation of the photoelectric conversion element on the basis of the control information.

The second aspect of a method of controlling a photoelectric conversion device according to the present invention is characterized by the following arrangement.

That is, a method of controlling operation for reading out an accumulated charge signal from a photoelectric conversion element constructed by a plurality of pixels while applying the signal with a predetermined amplification factor, comprises the control step of reading out control information from a memory corresponding to the photoelectric conversion element, and controlling the amplification factor on the basis of the control information.

The third aspect of a photoelectric conversion device according to the present invention is characterized by the following arrangement.

That is, a photoelectric conversion device comprises a plurality of photoelectric conversion elements, which are divided into a plurality of regions, accumulation start means for making the photoelectric conversion elements in the plurality of regions start accumulation, monitoring means for monitoring and outputting accumulation states of the photoelectric conversion elements in the respective regions in turn, determination means for comparing each of the monitor outputs output in turn with a predetermined value to determine if the accumulation of the photoelectric conversion element in the region corresponding to the monitor output is to end, and accumulation end means for, when the determination means determines that the accumulation is to end, ending the accumulation of the photoelectric conversion element in the region corresponding to the monitor output, and the monitoring means monitors and outputs the accumulation states in the respective regions at a predetermined time interval in turn, and makes the predetermined time interval different between a timing immediately after the beginning of the accumulation and a timing a certain period of time after the beginning of the accumulation.

The first aspect of a focus detection device according to the present invention is characterized by the following arrangement.

That is, a photoelectric conversion device comprises a plurality of photoelectric conversion elements, which are divided into a plurality of regions, accumulation start means for making the photoelectric conversion elements in the plurality of regions start accumulation, monitoring means for monitoring and outputting accumulation states of the photoelectric conversion elements in the respective regions in turn, determination means for comparing each of the monitor outputs output in turn with a predetermined value to determine if the accumulation of the photoelectric conversion element in the region corresponding to the monitor output is to end, accumulation end means for, when the determination means determines that the accumulation is to end, ending the accumulation of the photoelectric conversion element in the region corresponding to the monitor output, pixel read means for reading out pixels of the respective divided regions, and detection means for performing focus detection of an object by calculating pixel signals read out by the pixel read means, and the monitoring means monitors and outputs the accumulation states in the respective regions at a predetermined time interval in turn, and makes the predetermined time interval different between a timing immediately after the beginning of the accumulation and a timing a certain period of time after the beginning of the accumulation.

The third aspect of a method of controlling a photoelectric conversion device according to the present invention is characterized by the following arrangement.

That is, in a method of controlling a photoelectric conversion device which comprises a plurality of photoelectric conversion elements, which are divided into a plurality of regions, accumulation start means for making the photoelectric conversion elements in the plurality of regions start accumulation, monitoring means for monitoring and outputting accumulation states of the photoelectric conversion elements in the respective regions in turn, determination means for comparing each of the monitor outputs output in turn with a predetermined value to determine if the accumulation of the photoelectric conversion element in the region corresponding to the monitor output is to end, and accumulation end means for, when the determination means determines that the accumulation is to end, ending the accumulation of the photoelectric conversion element in the region corresponding to the monitor output, the monitoring means monitors and outputs the accumulation states in the respective regions at a predetermined time interval in turn, and makes the predetermined time interval different between a timing immediately after the beginning of the accumulation and a timing a certain period of time after the beginning of the accumulation.

The first aspect of a method of controlling a focus detection device according to the present invention is characterized by the following arrangement.

That is, in a method of controlling a focus detection device which comprises a plurality of photoelectric conversion elements, which are divided into a plurality of regions, accumulation start means for making the photoelectric conversion elements in the plurality of regions start accumulation, monitoring means for monitoring and outputting accumulation states of the photoelectric conversion elements in the respective regions in turn, determination means for comparing each of the monitor outputs output in turn with a predetermined value to determine if the accumulation of the photoelectric conversion element in the region corresponding to the monitor output is to end, accumulation end means for, when the determination means determines that the accumulation is to end, ending the accumulation of the photoelectric conversion element in the region corresponding to the monitor output, pixel read means for reading out pixels of the respective divided regions, and detection means for performing focus detection of an object by calculating pixel signals read out by the pixel read means, the monitoring means monitors and outputs the accumulation states in the respective regions at a predetermined time interval in turn, and makes the predetermined time interval different between a timing immediately after the beginning of the accumulation and a timing a certain period of time after the beginning of the accumulation.

The first aspect of a storage medium according to the present invention is characterized by the following arrangement.

That is, a storage medium stores a control program for controlling a photoelectric conversion device which comprises a plurality of photoelectric conversion elements, which are divided into a plurality of regions, accumulation start means for making the photoelectric conversion elements in the plurality of regions start accumulation, monitoring means for monitoring and outputting accumulation states of the photoelectric conversion elements in the respective regions in turn, determination means for comparing each of the monitor outputs output in turn with a predetermined value to determine if the accumulation of the photoelectric conversion element in the region corresponding to the monitor output is to end, and accumulation end means for, when the determination means determines that the accumulation is to end, ending the accumulation of the photoelectric conversion element in the region corresponding to the monitor output, and the control program has a code of the step of controlling the monitoring means to monitor and output the accumulation states in the respective regions at a predetermined time interval in turn, and to make the predetermined time interval different between a timing immediately after the beginning of the accumulation and a timing a certain period of time after the beginning of the accumulation.

The second aspect of a storage medium according to the present invention is characterized by the following arrangement.

That is, a storage medium stores a control program for controlling a focus detection device which comprises a plurality of photoelectric conversion elements, which are divided into a plurality of regions, accumulation start means for making the photoelectric conversion elements in the plurality of regions start accumulation, monitoring means for monitoring and outputting accumulation states of the photoelectric conversion elements in the respective regions in turn, determination means for comparing each of the monitor outputs output in turn with a predetermined value to determine if the accumulation of the photoelectric conversion element in the region corresponding to the monitor output is to end, accumulation end means for, when the determination means determines that the accumulation is to end, ending the accumulation of the photoelectric conversion element in the region corresponding to the monitor output, pixel read means for reading out pixels of the respective divided regions, and detection means for performing focus detection of an object by calculating pixel signals read out by the pixel read means, and the control program has a code of the step of controlling the monitoring means to monitor and output the accumulation states in the respective regions at a predetermined time interval in turn, and to make the predetermined time interval different between a timing immediately after the beginning of the accumulation and a timing a certain period of time after the beginning of the accumulation.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described hereinafter with reference to the accompanying drawings.

First Embodiment

Figure 1:
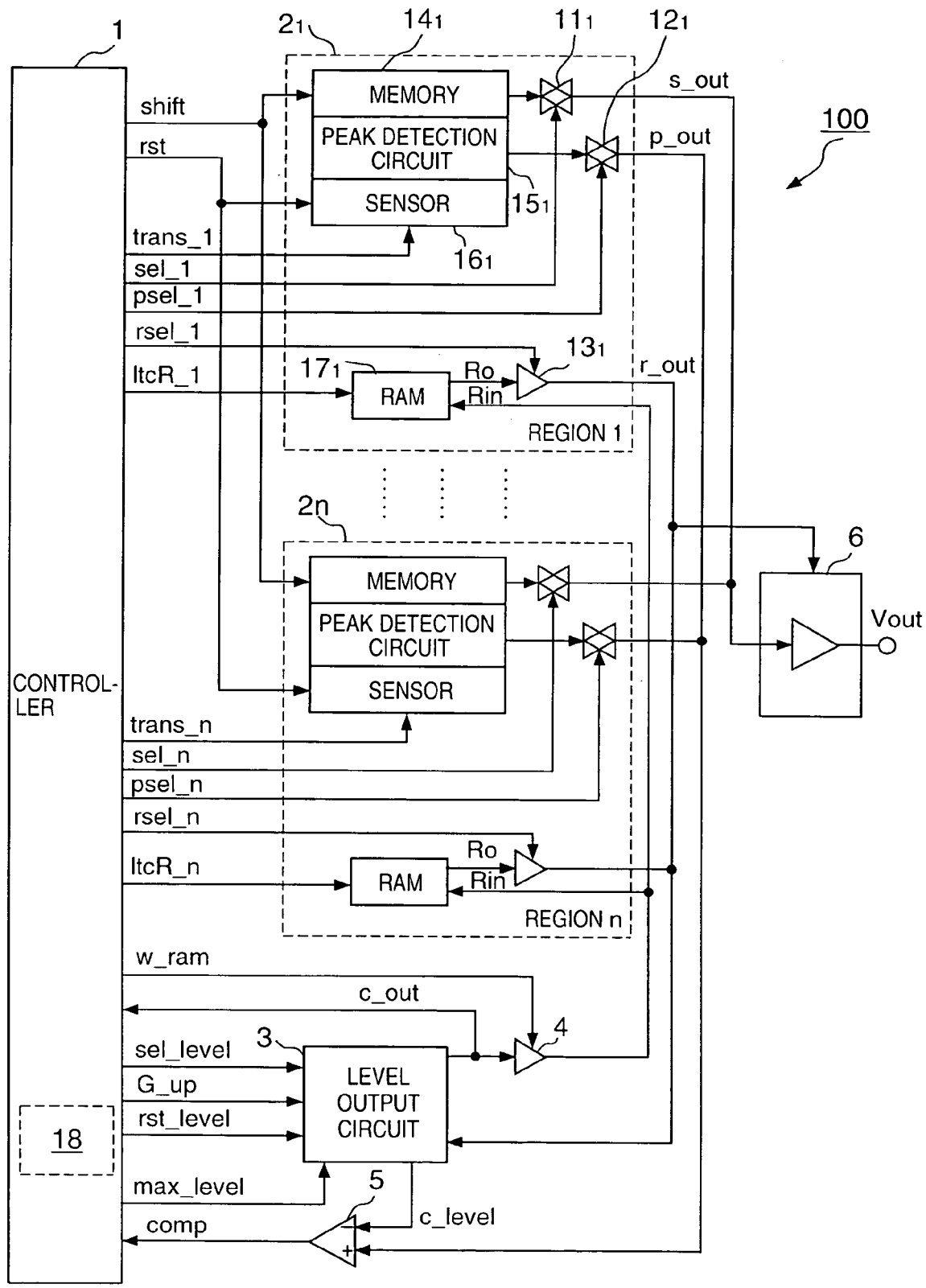
FIG. 1 is a block diagram showing the arrangement of a photoelectric conversion device to which a photoelectric conversion device of the present invention in the first embodiment.

A photoelectric conversion device according to the present invention is realized by, e.g., a photoelectric conversion device 100 shown in FIG. 1.

The photoelectric conversion device 100 is capable of multi-point AF, and comprises a controller 1, a plurality of sensor array blocks $2_1$ to $2_n$, a level output circuit 3, a buffer 4 with a selection signal, a comparator 5, and a read amplifier 6, as shown in FIG. 1.

The plurality of sensor array blocks $2_1$ to $2_n$ are set in correspondence with a plurality of distance measurement points (to be referred to as regions 1 to n hereinafter), and have the same arrangement.

For example, the sensor array block $2_1$ corresponding to region 1 of regions 1 to n comprises analog switches $11_1$ and $12_1$, a buffer $13_1$ with a selection signal, a memory $14_1$, a peak detection circuit $15_1$, a sensor $16_1$, and a RAM $17_1$.

The building units of the photoelectric conversion device 100 will be explained below.

(Controller 1)

The controller 1 corresponds to control means, and performs operation control of the overall device and, especially, charge accumulation control of the sensor array blocks $2_1$ to $2_n$.

As will be described in detail later, the controller 1 has a program memory 18 which pre-stores a processing program for performing various kinds of control operations, and when the processing program stored in the program memory 18 is read out and executed by the controller 1, the operation control of the overall device as well as charge accumulation control is executed.

(Sensor Array Blocks $2_1$ to $2_n$)

The sensor array blocks $2_1$ to $2_n$ correspond to photoelectric conversion means.

For example, in the sensor array block $2_1$, the sensor $16_1$ comprises a pair of sensor arrays for phase difference detection, and forms the first image by around 30 to 80 pixels, and the second image by the same number of pixels.

The peak detection circuit $15_1$ corresponds to monitor means. The circuit $15_1$ detects the maximum accumulated charge amount (the output value of a pixel that exhibits the highest output) during charge accumulation of the sensor $16_1$, and outputs it to the analog switch $12_1$.

At this time, when the analog switch $12_1$ is ON in response to a signal psel_1 from the controller 1, an output signal p_out from the peak detection circuit $15_1$ is output to one input terminal ("+" terminal) of the comparator 5 via the analog switch $12_1$.

The memory $14_1$ temporarily holds charges accumulated on the sensor $16_1$ as pixel signals simultaneously with the end of charge accumulation on the sensor $16_1$.

At this time, when the analog switch $11_1$ is ON in response to a signal sel_1 from the controller 1, since a signal shift output from the controller 1 is supplied to the memory $14_1$, pixel signals s_out held on the memory $14_1$ are sequentially output to the input terminal of the read amplifier 6 via the analog switch $11_1$.

The RAM $17_1$ corresponds to storage means, and serves as a memory for storing information (control information) associated with charge accumulation on the sensor $16_1$. Upon reception of a signal ltcR_1 from the controller 1, the RAM $17_1$ stores the value of a signal Rin from the level output circuit 3 (to be described later). At least the sensor array blocks $2_1$ to $2_n$ and the RAM $17_1$ to $17_n$ are arranged on the same semiconductor substrate.

When the controller 1 supplies a signal rsel_1 to the buffer $13_1$ with a selection signal, an output signal Ro from the RAM $17_1$ is output as a signal r_out via the buffer $13_1$ with a selection signal. The output signal r_out is supplied to the read amplifier 6 and level output circuit 3. Note that the signal r_out is 2-bit data.

Since the remaining sensor array blocks $2_2$ to $2_n$ have the same arrangement as that of the aforementioned sensor array block $2_1$, a detailed description thereof will be omitted.

(Level Output Circuit 3)

Figure 2:
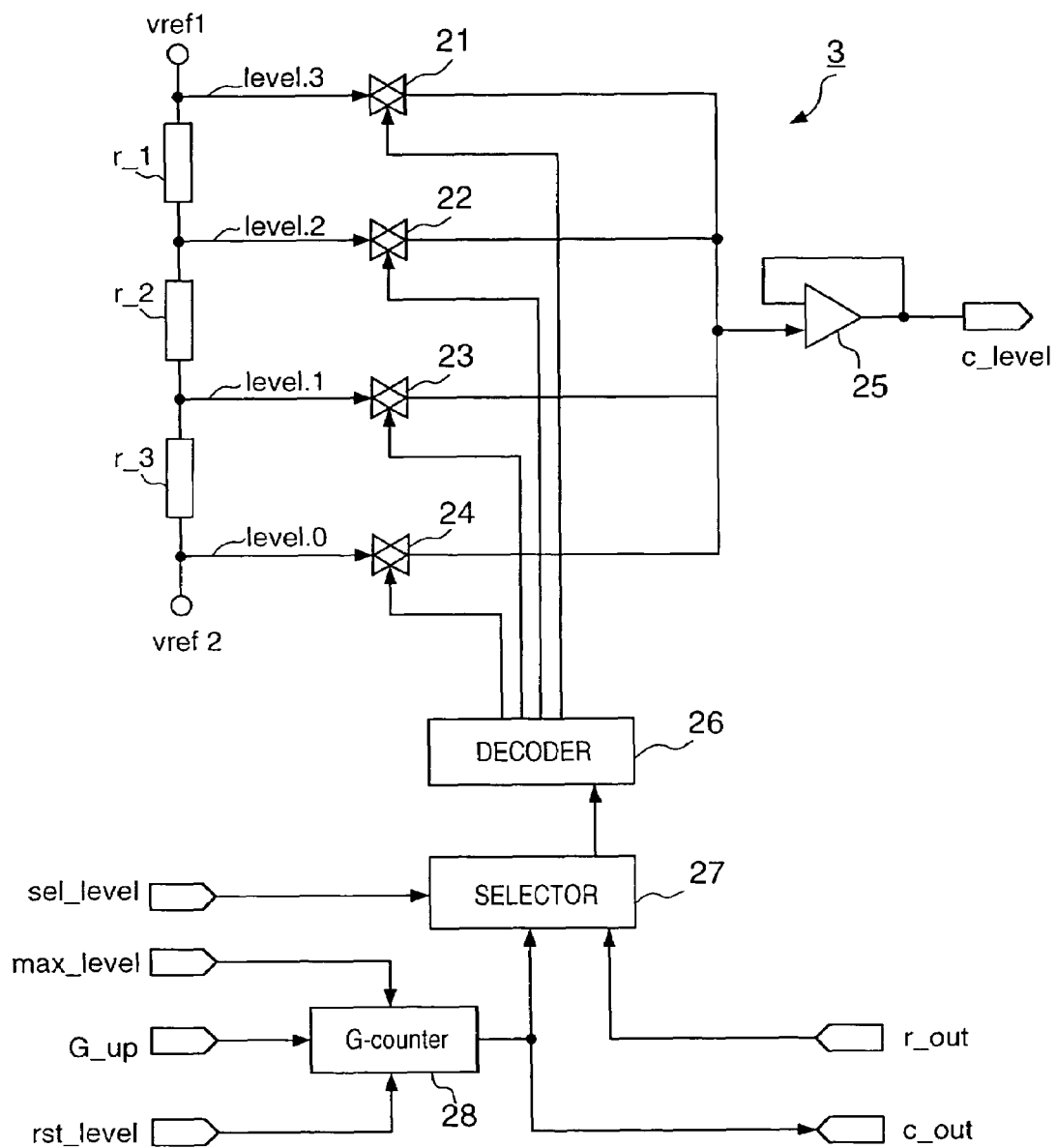
FIG. 2 is a block diagram showing the arrangement of a level output circuit of the photoelectric conversion device.

The level output circuit 3 corresponds to selection means or determination means, and comprises three resistors r_1, r_2, and r_3, four analog switches 21 to 24, an amplifier 25, a decoder 26, a selector 27, and a counter 28, as shown in, e.g., FIG. 2. The selector 7 receives a signal r_out selectively output from the sensor array blocks $2_1$ to $2_n$ (e.g., in the sensor array block $2_1$, the signal r_out output from the RAM $17_1$ via the buffer $13_1$ with a selection signal), and an output signal c_level of the amplifier 25 and an output signal c_out of the counter 28 determine the outputs from the level output circuit 3. Note that the output signal c_out is 2-bit data.

In such level output circuit 3, the three resistors r_1, r_2, and r_3 are inserted between two reference potentials vref1 and vref2, and voltage-divide the two reference potentials vref1 and vref2 into four voltage values (level values as status information) level1.3, level1.2, level1.1, and level1.0, which are output in correspondence with the analog switches 21 to 24.

At that time, one of the analog switch 21 to 24 is turned on depending on the output from the decoder 26, and only the output from the ON analog switch is output to the input terminal of the amplifier 25. In this way, one of the four level values level1.3, level1.2, level1.1, and level1.0 is selected, and the selected level value is output as a signal c_level from the amplifier 25.

The decoder 26 selects one of the four analog switches 21 to 24 in accordance with an output signal sel_out from the selector 27, and outputs a signal for turning on the selected analog switch. Note that the output signal sel_out is 2-bit data.

The selector 27 selects one of an output signal c_out from the counter 28 and the signal r_out selectively output from the sensor array blocks $2_1$ to $2_n$ upon reception of a signal sel_level from the controller 1, and outputs the selected signal as the signal sel_out to the decoder 26.

The counter 28 initializes its count value to "0" upon reception of a signal rst_level from the controller 1, and increments its count value upon reception of a signal G_up from the controller 1. The count value of the counter 28 serves as the signal c_out.

Note that a signal max_level supplied from the controller 1 to the counter 28 will be explained later.

(Buffer 4 with Selection Signal)

The buffer 4 with a selection signal receives the signal c_out (the count value of the counter 28) from the level output circuit 3, and outputs the signal c_out as a signal Rin to be written in the RAMs $17_1$ to $17_n$ of the sensor array blocks $2_1$ to $2_n$ upon reception of a signal W_ram from the controller 1.

(Comparator 5)

The comparator 5 corresponds to comparison means, and receives the signal c_level (the output from the amplifier 25) from the level output circuit 3, and a signal p_out selectively output from the sensor array blocks $2_1$ to $2_n$ (e.g., in the sensor array block $2_1$, a signal p_out output from the peak detection circuit $15_1$ via the analog switch $12_1$). The comparator 5 compares the signals c_level and p_out, and outputs the comparison result as a signal comp to the controller 1.

Note that the output signal comp from the comparator 5 is set at "1" when the signal p_out is larger than the signal c_level.

The read amplifier 6 corresponds to read means, and receives a signal r_out selectively output from the sensor array blocks $2_1$ to $2_n$ (e.g., in the sensor array block 21, a signal r_out output from the RAM $17_1$ via the buffer $13_1$ with a selection signal), and pixel signals s_out selectively output from the sensor array blocks $2_1$ to $2_n$ (e.g., in the sensor array block $2_1$, pixel signals s_out output from the memory $14_1$ via the analog switch $12_1$). The read amplifier 6 multiplies each pixel signal s_out by a gain according to the signal r_out, and outputs it as a signal Vout.

The respective building units of the photoelectric conversion device 100 have been described.

The controller 1 which performs the operation control of the entire photoelectric conversion device 100, especially, the charge accumulation control of the sensor array blocks $2_1$ to $2_n$, will be described in detail below.

Note that a control method according to the present invention is executed by the controller 1.

Figure 3:
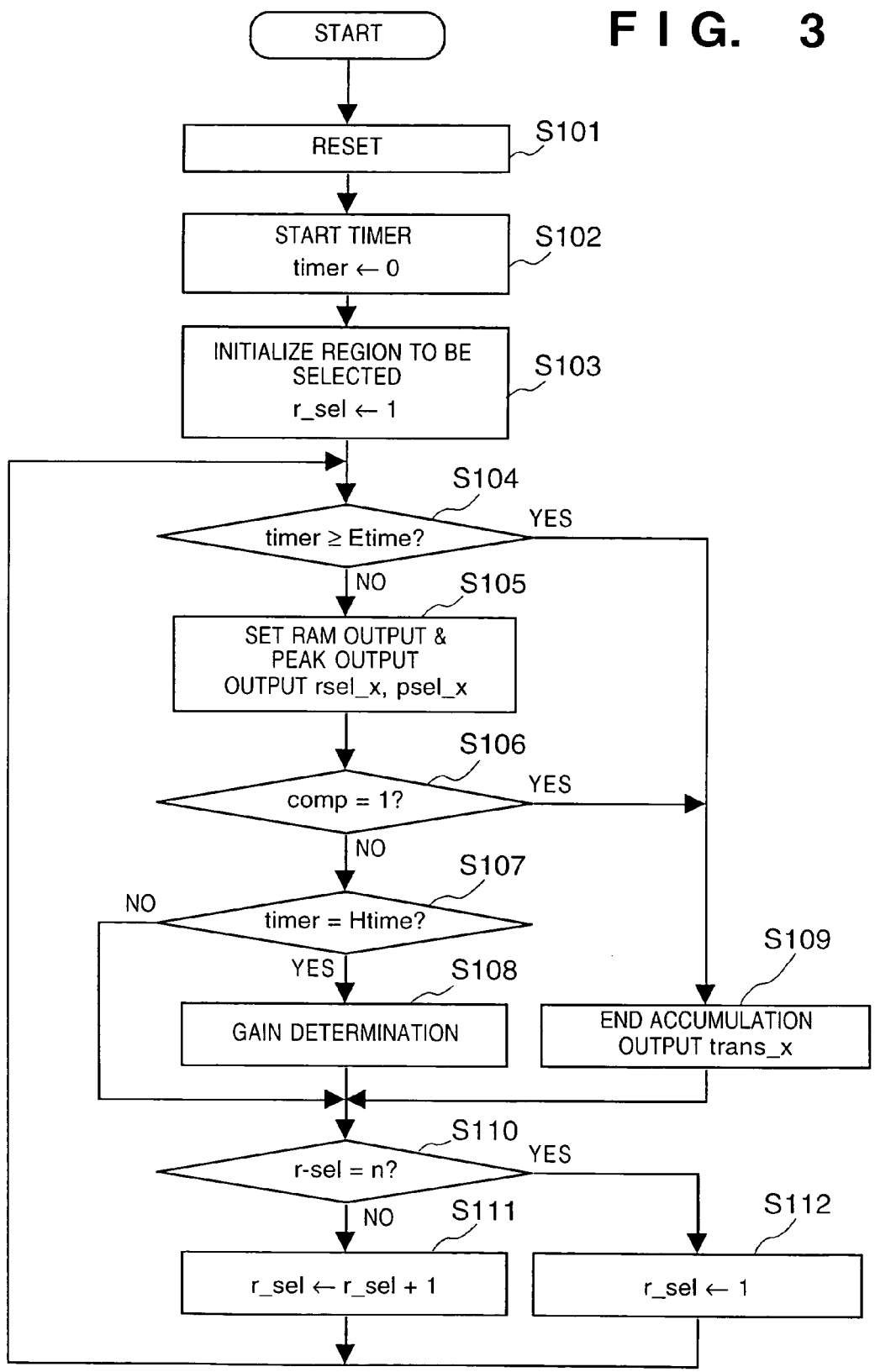
FIG. 3 is a flow chart for explaining a charge accumulation control program (main processing) executed by a controller of the photoelectric conversion device.
Figure 4:
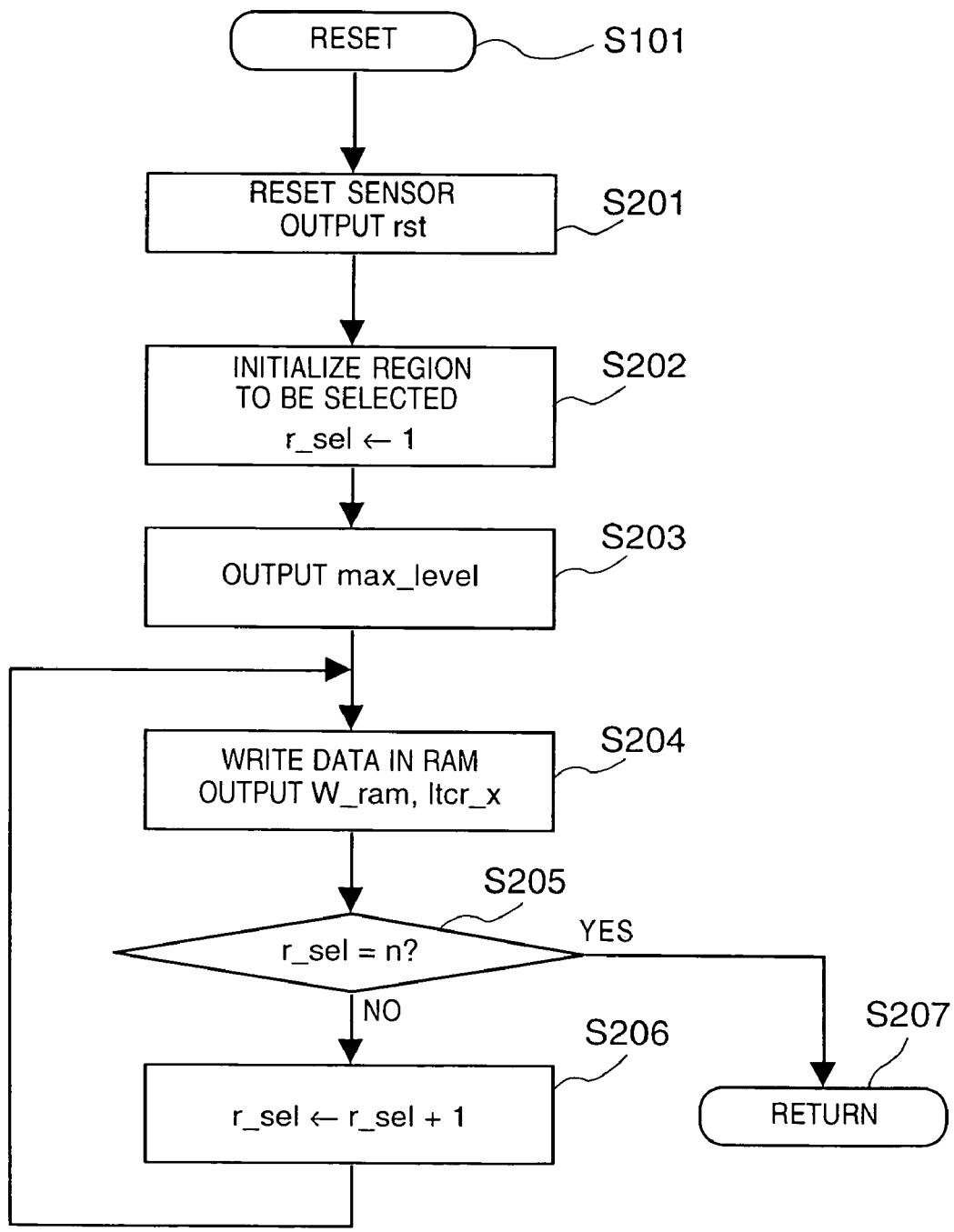
FIG. 4 is a flow chart for explaining a reset program in the charge accumulation control program.
Figure 5:
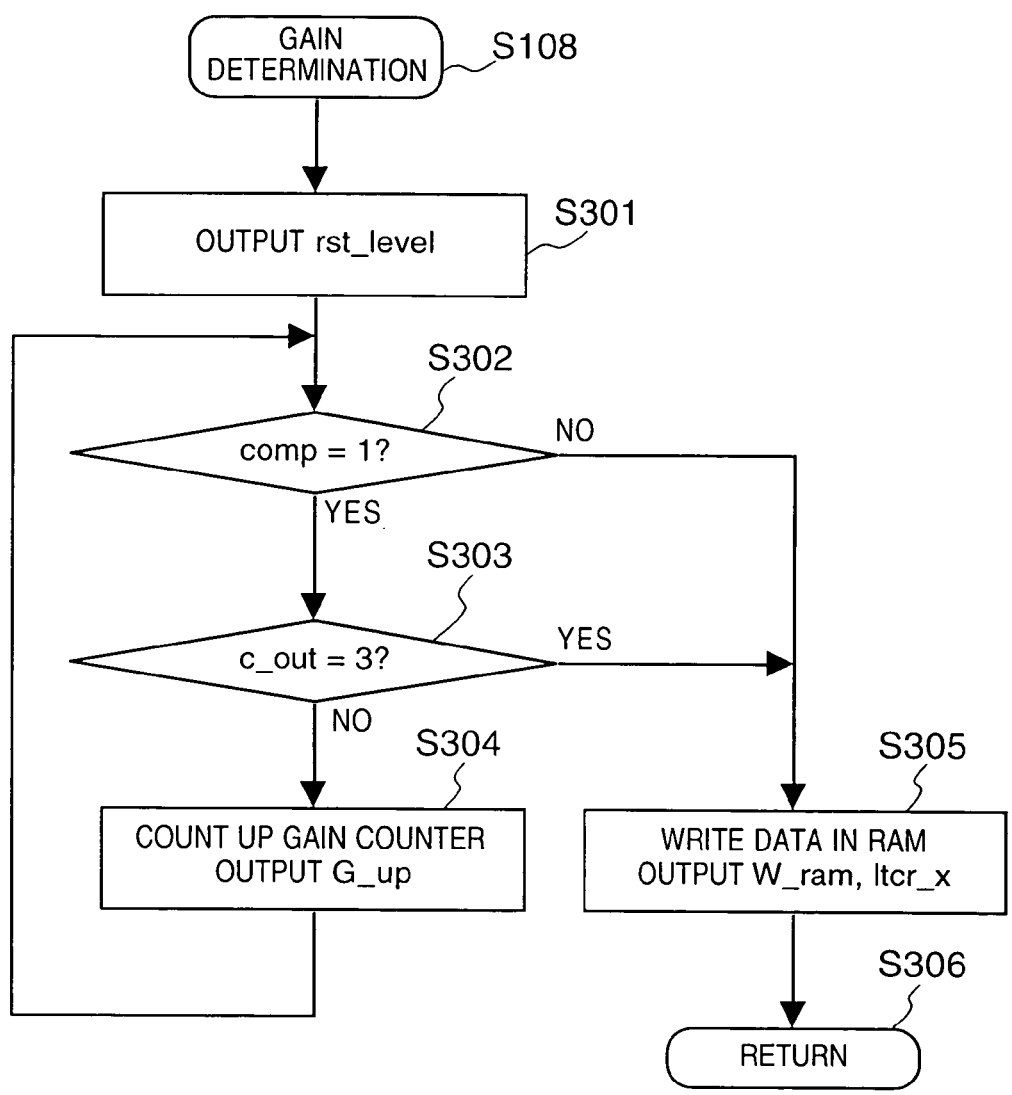
FIG. 5 is a flow chart for explaining a gain determination program in the charge accumulation control program.

For example, the program memory 18 of the controller 1 stores processing programs according to the flow charts shown in FIGS. 3 to 5, and when these processing programs are read out and executed by the controller 1, the following charge accumulation control is done.

(Main Processing: FIG. 3)

The controller 1 performs the following reset processing first (step S101).

(Main Processing—Reset Processing: FIG. 4)

The controller 1 outputs a reset signal rst to the sensors $16_1$ to $16_n$ of the sensor array blocks $2_1$ to $2_n$ (step S201).

In response to this signal, charges on the sensors $16_1$ to $16_n$ of the sensor array blocks $2_1$ to $2_n$ are cleared, thus starting actual charge accumulation.

The controller 1 then sets a register value r_sel of its internal register (not shown) for sensor array block selection (region selection) at an initial value "1" (step S202).

The controller 1 outputs a signal max_level to the level output circuit 3 (step S203).

In response to this signal, the count value (signal c_out) of the counter 28 in the level output circuit 3 is set at "3".

The controller 1 outputs a signal W_ram to the buffer with a selection signal, and outputs signals ltcR_x (x=1 to n) to the RAM $17_x$ of the sensor array block $2_x$ selected according to the register value r_sel (step S204).

Note that the register value r_sel indicates the sensor array block (region) to be selected, and "x=r_sel".

With this signal, the RAM $17_x$ in the sensor array block $2_x$ (x=r_sel=1 to n) corresponding to the register value r_sel stores the output signal c_out (count value="3") from the level output circuit 3.

The controller 1 checks if the register value r_sel is "n", i.e., if "3" is written in the RAMs $17_1$ to $17_n$ in the sensor array blocks $2_1$ to $2_n$ corresponding to all the regions 1 to n (step S205).

If the end of write is not determined in step S205, the controller 1 increments the register value r_sel (step S206), and the flow returns to step S204 to repeat the subsequent processes.

In this way, "3" is written in the RAMs $17_1$ to $17_n$ in the sensor blocks $2_1$ to $2_n$ corresponding to all the regions 1 to n.

After that, the control returns to the main processing shown in FIG. 3 (step S207).

(Main Processing: FIG. 3)

Upon completion of the reset processing in step S101, the controller 1 then sets its internal timer (not shown) at an initial value "0" (timer=0), thereby starting time measurement of charge accumulation (step S102).

The controller 1 sets the register value r_sel of its internal register used in the aforementioned reset processing at an initial value "1" (step S103).

The controller 1 then checks if the timer value timer of the internal timer has exceeded a maximum accumulation time Etime (step S104).

If "timer≧Etime", the flow advances to step S109 (to be described later).

On the other hand, if "timer<Etime" in step S104, the controller 1 outputs a signal psel_x to the analog switch $12_x$ in the sensor array block $2_x$ selected in accordance with the register value r_sel.

Also, the controller 1 outputs a signal rsel_x to the buffer $13_x$ with a selection signal of in the sensor array block $2_x$, and a signal sel_level to the level output circuit 3 (step S105).

In response to these signals, the output signal (maximum accumulated charge amount) of the peak detection circuit $15_x$ in the sensor array block $2_x$ is output to one input terminal ("+" terminal) of the comparator 5 as a signal p_out via the analog switch $12_x$.

The output from the RAM $17_x$ in the sensor array block $2_x$ is supplied as a signal r_out to the read amplifier 6 and level output circuit 3 via the buffer $13_x$ with a selection signal. In the level output circuit 3, the selector 27 selects the signal r_out, and that selected signal is directly supplied to the decoder 26 as a signal sel_out. The decoder 26 selects one of the four level values level1.3, level1.2, level1.1, and level1.0 in accordance with the signal sel_out. The selected level value is output as a signal c_level via the amplifier 25.

Subsequently, the controller 1 checks if the output signal comp from the comparator 5 is "1", i.e., if the output signal (level value) c_level of the level output circuit 3 is larger than the output signal p_out of the peak detection circuit $15_x$ in the sensor array block $2_x$ (step S106).

If "comp=1", the flow advances to step S109 (to be described later).

On the other hand, if "comp≠1" in step S106, the controller 1 checks if the timer value timer of the internal timer reaches an intermediate accumulation time Htime (step S107).

If "timer≠Htime", the flow advances to step S110 (to be described later).

Note that "timer=Htime" means that the timer value timer of the internal timer roughly equals the intermediate accumulation time Htime. The time required for completing gain determination (to be described later) for all the regions can be sufficiently determined to be "timer=Htime".

If "timer=Htime" in step S107, the controller 1 executes the following gain determination (step S108).

(Main Processing—Gain Determination: FIG. 5)

The controller 1 outputs a signal rst_level to the level output circuit 3 (step S301).

In response to this signal, in the level output circuit 3, the count value of the counter 28 is cleared to "0", and its output signal c_out="0" is output.

The controller 1 checks if the output signal comp of the comparator 5 is "1", i.e., if the output signal c_level of the level output circuit 3 is larger than the output signal p_out of the peak detection circuit $15_x$ in the sensor array block $2_x$ (step S302).

As a result of checking, if "comp≠1", the flow advances to step S305 (to be described later).

On the other hand, if "comp=1" in step S302, the controller 1 checks if the output signal c_out from the level output circuit 3 is "3" (step S303).

If "c_out=3", the flow advances to step S305 (to be described later).

If "c_out≠3" in step S303, the controller 1 outputs a signal G_up to the level output circuit 3 (step S304).

In response to this signal, in the level output circuit 3, the count value (c_out) of the counter 28 is incremented.

After that, the flow returns to step S302 to repeat the subsequent processes.

If "comp≠1" in step S302, or if "c_out=3" in step S303, the controller 1 outputs a signal W_ram to the buffer 4 with a selection signal, and signals ltcR_x to the RAM $17_x$ in the sensor array block $2_x$ (step S305).

In response to these signals, the RAM $17_x$ in the sensor array block $2_x$ stores the output signal c_out of the level output circuit 3.

After this processing, the control returns to the main processing shown in FIG. 3 (step S306).

As described above, in this gain determination, the gain of the read amplifier 6, i.e., the charge accumulation end level (the output signal c_out of the level output circuit 3) is determined on the basis of the output signal p_out from the peak detection circuit $15_x$ in the sensor array block $2_x$, and the count value (c_out) corresponding to the determined level is written in the RAM $17_x$ in the sensor array block $2_x$.

Since this count value (c_out), i.e., the count value of the counter 28 of the level output circuit 3 is counted up one by one from the initial value "0", the output signal c_level of the level output circuit 3 gradually increases from "level1.0" to "level1.1", from "level1.1" to "level1.2", and so on.

Hence, when "comp=1" is not detected at "level1.0", since the output signal p_out from the peak detection circuit $15_x$ is lower than "level1.0", the charge accumulation end level is determined to be "level1.0", and the count value (c_out=0) corresponding to that level is written in the RAM $17_x$.

After "comp=1" is detected at "level1.0", when "comp=1" is not detected at "level1.0", since the output signal p_out of the peak detection circuit $15_x$ falls within the range between "level1.0", and "level1.1", the charge accumulation end level is determined to be "level1.1", and the count value (c_out=1) corresponding to that level is written in the RAM $17_x$.

Similarly, when the output signal p_out falls within the range between "level1.1" and "level1.2", "level1.2" is determined. When the output signal p_out falls within the range between "level1.2" and "level1.3", "level1.3" is determined. In each case, the corresponding count value (c_out=2 or 3) is written.

(Main Processing: FIG. 3)

On the other hand, if "timer≧Etime" (the timer value timer of the internal timer has exceeded the maximum accumulation time Etime) in step S104, or if "comp=1" (the level value c_level has exceeded the output signal p_out of the peak detection circuit $15_x$ in the sensor array block $2_x$) in step S106, the controller determines the end of charge accumulation, and outputs a signal trans indicating this to the sensor $16_x$ in the sensor array block $2_x$ (step S109).

In response to this signal, in the sensor array block $2_x$ corresponding to the region x, charges accumulated on the respective pixels of the sensor $16_x$ are transferred as pixel signals to the memory $14_x$, thus ending charge accumulation on the sensor $16_x$.

After the processing in step S109, or after the aforementioned gain determination (step S108), or if "timer=Htime" is not detected (the timer value timer of the internal timer does not exceed the intermediate accumulation time Htime), the controller 1 checks if the register value r_sel of the internal register is "n", i.e., if the processes in step S104 to S109 are complete for the sensor array blocks $2_1$ to $2_n$ corresponding to all the regions 1 to n (step S110).

If "r_sel=n" in step S110, the controller 1 resets the register value r_sel of the internal register to "1", to select the sensor array block 21 corresponding to the initial region 1, and repeats the processes from step S104.

On the other hand, if "r_sel≠n", the controller 1 increments the register value r_sel of the internal register to select the next sensor array block $2_{x+1}$ corresponding to the next region (x+1) and repeats the processes from step S104.

The charge accumulation control on the sensor array blocks $2_1$ to $2_n$ by the controller 1 has been described.

The operations of the sensor array blocks $2_1$ to $2_n$ by the aforementioned charge accumulation control will be explained below with reference to FIGS. 6A and 6B.

Figure 6A:
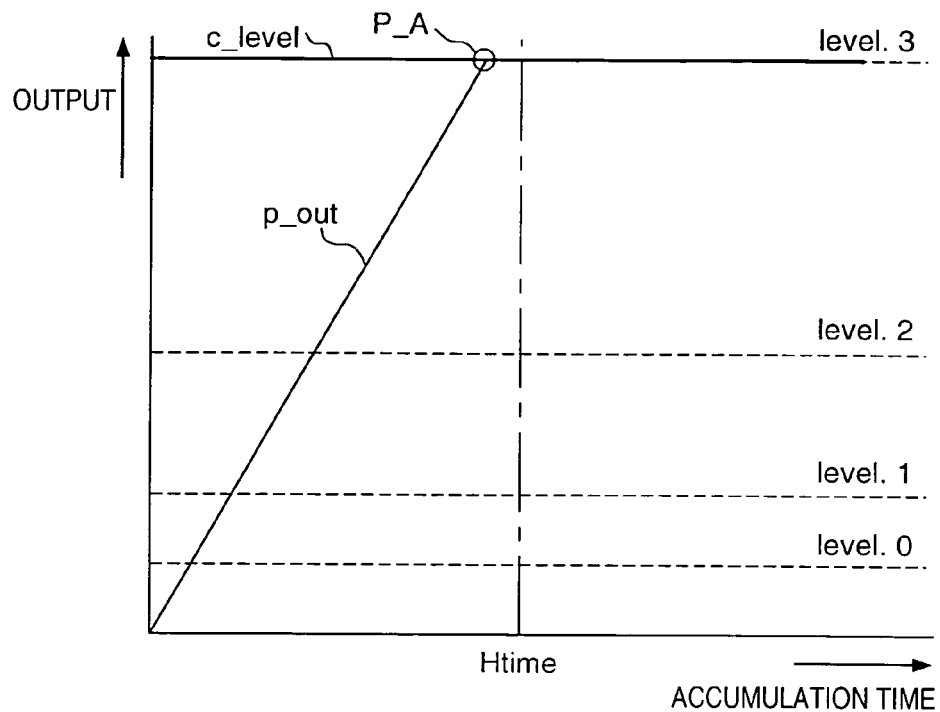
FIGS. 6A and 6B are graphs for explaining the charge accumulation in the photoelectric conversion device.
Figure 6B:
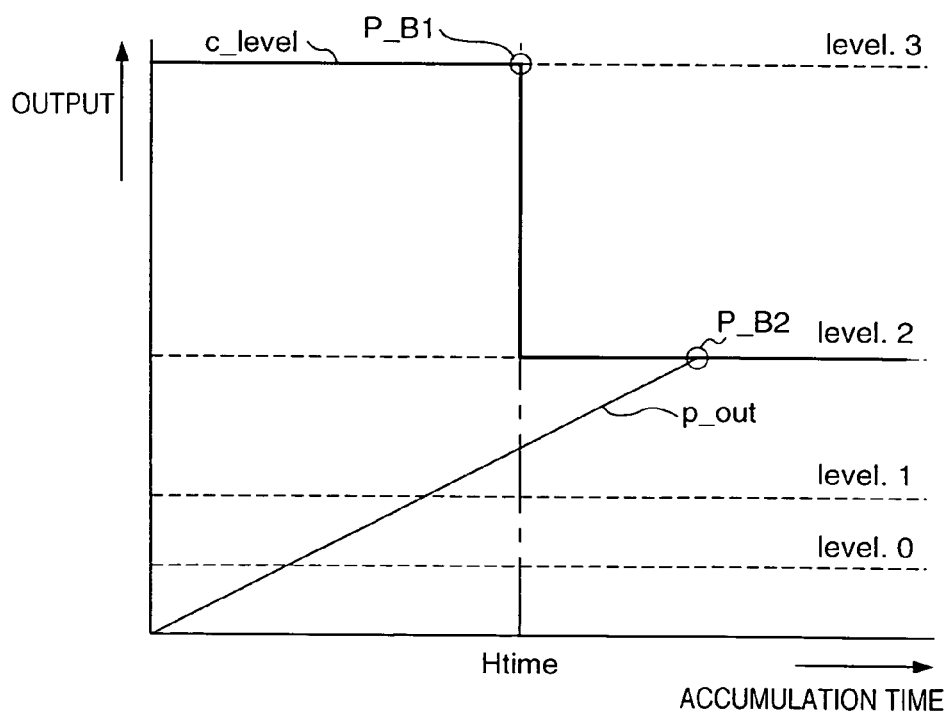

In FIGS. 6A and 6B, the abscissa plots the charge accumulation time, and the ordinate plots the output signal c_level of the level output circuit 3, and the output signal p_out of the peak detection circuit $15_x$ in the sensor array block $2_x$.

FIG. 6A shows a case wherein the object is relatively bright, and the peak output of each pixel signal, i.e., the output signal p_out of the peak detection circuit $15_x$ of the sensor array block $2_x$ rises quickly. FIG. 6B shows, contrary to FIG. 6A, a case wherein the object is relatively dark, and the peak output of each pixel signal rises slowly.

(Case of FIG. 6A)

When charge accumulation is started, since "3" is written in the RAMs $17_1$ to $17_n$ in the sensor array blocks $2_1$ to $2_n$ corresponding to all the regions 1 to n, the output signal c_level of the level output circuit 3 indicates "level1.3".

When the output signal p_out from the peak detection circuit $15_x$ in the sensor array block $2_x$ corresponding to a certain region x has reached this "level1.3" (point P_A), the charge accumulation in that sensor array block $2_x$ ends.

Note that the same applies to the sensor array blocks corresponding to other regions.

(Case of FIG. 6B)

When charge accumulation is started, since "3" is written in the RAMs $17_1$ to $17_n$ in the sensor array blocks $2_1$ to $2_n$ corresponding to all the regions 1 to n, the output signal c_level of the level output circuit 3 indicates "level1.3".

In this case, since the peak output (p_out) of each pixel signal rises slowly, when the charge accumulation time (the timer value timer of the internal timer) has reached the intermediate accumulation time Htime (point P_B1), the gain determination (step S108) shown in FIG. 5 is executed to determine the charge accumulation end level (c_level) for the sensor array blocks $2_1$ to $2_n$ corresponding to regions 1 to n.

Referring to FIG. 6B, since the output signal p_out from the peak detection circuit $15_x$ in the sensor array block $2_x$ corresponding to a certain region x falls within the range between "level1.1" and "level1.2", c_level is determined to be "level1.2" for this sensor array block $2_x$, and this information ("c_out=2" in this case) is written in the RAM $17_x$. When the output signal p_out from the peak detection circuit $15_x$ has reached "level1.2" (point P_B2), the charge accumulation in that sensor array block $2_x$ ends.

Note that the charge accumulation end level is determined in each of the sensor array blocks corresponding to regions other than region x, and that information is written in the corresponding RAM. When the peak output has reached the determined charge accumulation completion level, the charge accumulation in that sensor array block ends.

As described above, according to this embodiment, since information associated with charge accumulation (in this case, the value (c_out) corresponding to the charge accumulation end level (c_level)) is written in the RAMs $17_1$ to $17_n$ in the sensor array blocks $2_1$ to $2_n$ corresponding to all the regions 1 to n, charge accumulation control of the sensor array blocks $2_1$ to $2_n$ corresponding to regions 1 to n can be independently made.

In addition, since operations such as count-up operation and the like are not done immediately after the beginning of charge accumulation even for a high-luminance object, the image signal of the object can be prevented from exceeding the dynamic range, and the image is never distorted.

Hence, an accurate photoelectric conversion device 100 which can always appropriately perform charge accumulation control without increasing the circuit scale even when the number of distance measurement points of multi-point AF is increased, can be provided.

Second Embodiment

In this embodiment, for example, in the photoelectric conversion device 100 in the first embodiment described above, read control of pixel signals in the read amplifier 6 is performed as follows.

Figure 7:
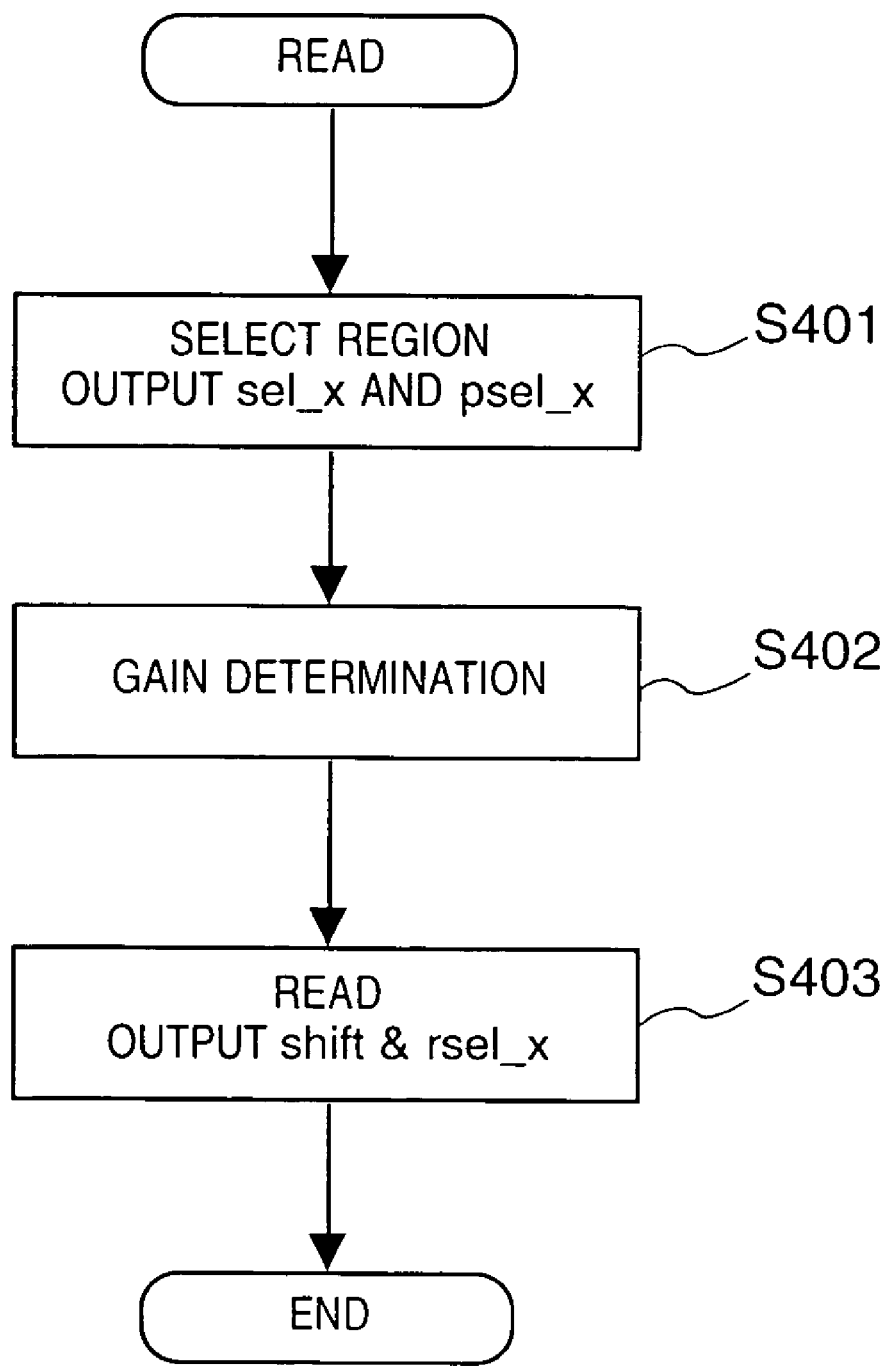
FIG. 7 is a flow chart for explaining a read control program of pixel signals executed by the controller of the photoelectric conversion device in the second embodiment.
Figure 8:
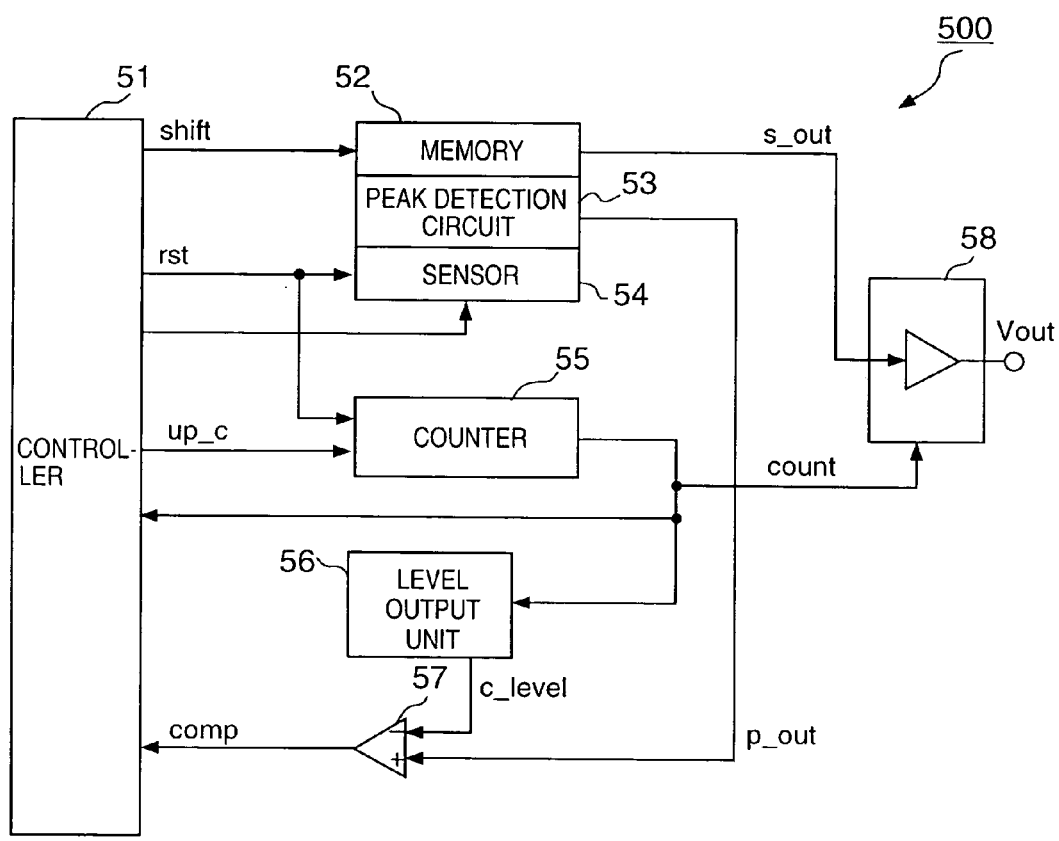
FIG. 8 is a block diagram showing the arrangement of a conventional photoelectric conversion device.
Figure 9:
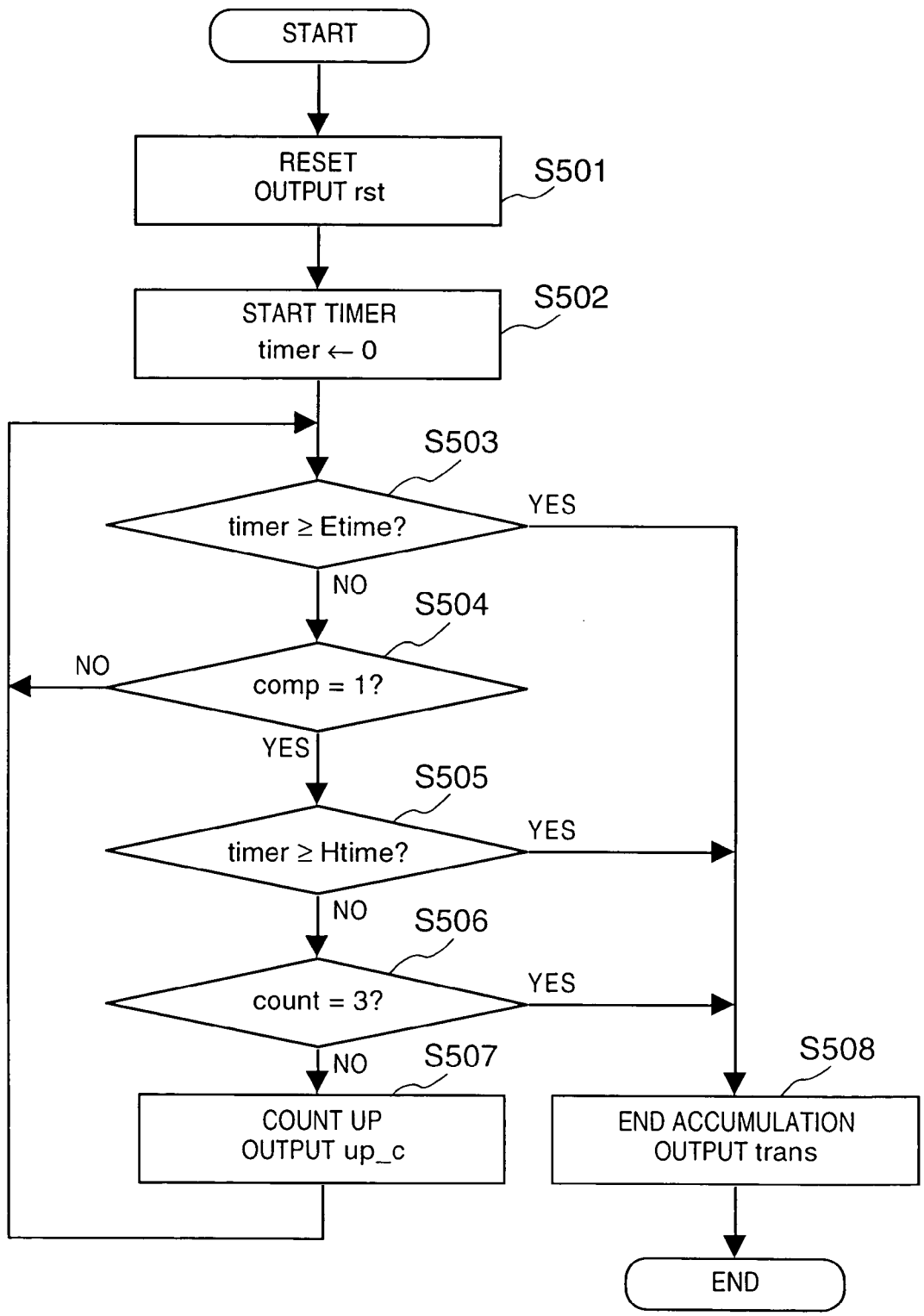
FIG. 9 is a flow chart for explaining conventional charge accumulation control.
Figure 10A:
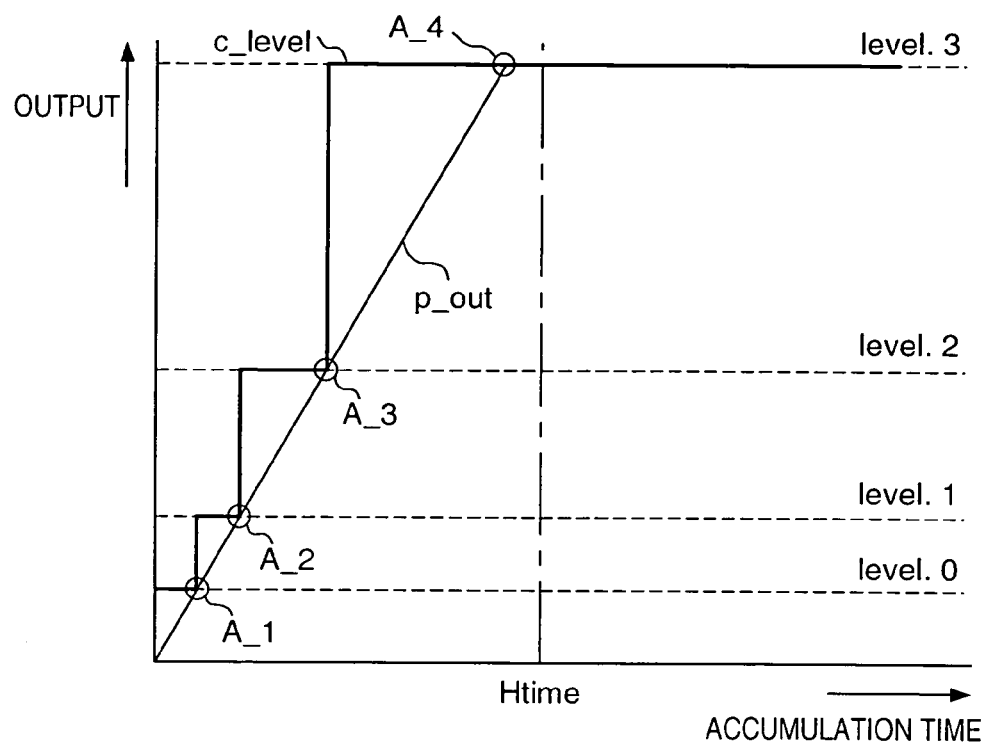
FIGS. 10A and 10B are graphs for explaining the charge accumulation in the conventional photoelectric conversion device.
Figure 10B:
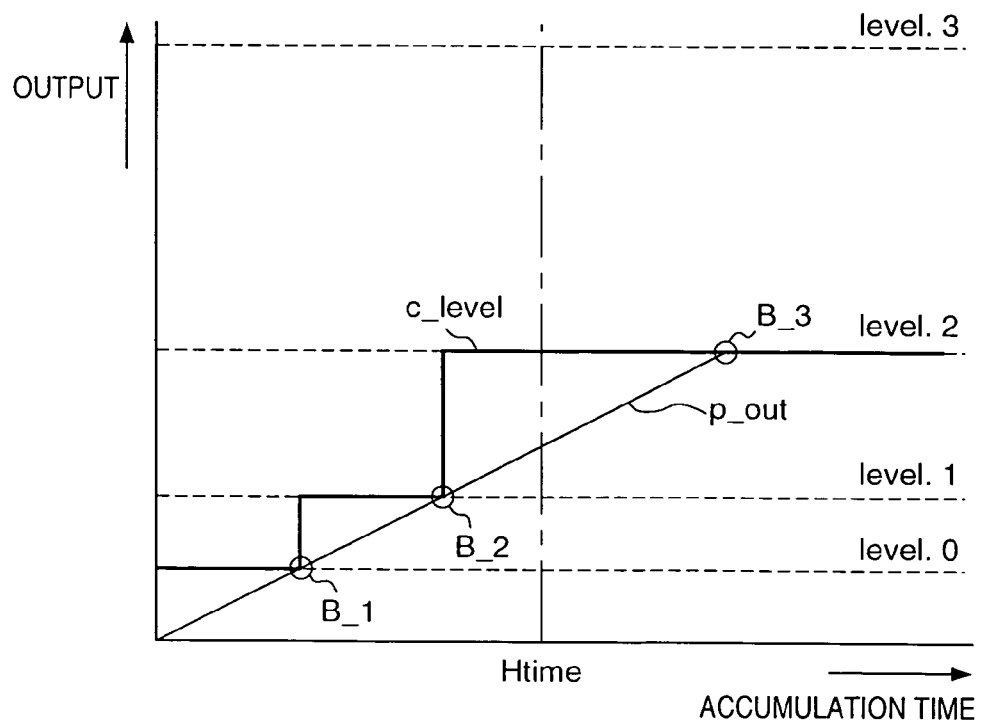

The program memory 18 of the controller 1 pre-stores a processing program according to the flow chart shown in FIG. 7, and when this processing program is read out and executed by the controller 1, the following read control is done.

The controller 1 selects a region from which pixel signals are to be read (in this case, a region x (x=1 to n), and stores a value (=x) corresponding to the region x in its internal register. The controller 1 then outputs a signal sel_x to the analog switch $11_x$ in the sensor array block $2_x$.

In this way, in the sensor array block $2_x$, pixel signals s_out held in the memory $14_x$ are ready to be sequentially output to the input terminal of the read amplifier 6 via the analog switch $11_x$.

Also, the controller 1 outputs a signal psel_x to the analog switch $12_x$ in the sensor array block $2_x$.

In response to this signal, in the sensor array block $2_x$, the output signal p_out from the peak detection circuit $15_x$ is output to one input terminal ("+" terminal) of the comparator 5 via the analog switch $12_x$ (step S401).

The controller 1 then executes the gain determination shown in FIG. 5.

In this fashion, the level (the output signal c_level of the level output circuit 3) is determined on the basis of the output signal p_out from the peak detection circuit $15_x$ in the sensor array block $2_x$, and the count value (c_out) corresponding to the determined level is written in the RAM $17_x$ in the sensor array block $2_x$ (step S402).

The controller 1 outputs a signal shift to the memory $14_x$ in the sensor array block $2_x$.

In response to this signal, the pixel signals s_out held in the memory $14_x$ are sequentially output to the input terminal of the read amplifier 6 via the analog switch $11_x$.

Also, the controller 1 outputs a signal rsel_x to the buffer $13_x$ in the sensor array block $2_x$.

As a result, the value (c_out) written in the RAM $17_x$ is read out as a signal Ro, and is output as a signal r_out to the read amplifier 6 via the buffer $13_x$ with a selection signal.

Hence, the read amplifier 6 multiplies each pixel signal s_out from the memory $14_x$ by a gain based on the signal r_out, e.g., a gain selected from a plurality of preset gains in accordance with the signal r_out, and outputs it from the output terminal Vout (step S403).

To restate, according to this embodiment, the gain determination (level determination upon completion of charge accumulation) shown in FIG. 5 is performed immediately before pixel signals are read out. For this reason, even when gain determination cannot be done during charge accumulation by setting a constant charge accumulation time in, e.g., moving body predictive AF, that gain determination is done immediately before pixel signals are read out, and the pixel signals are read out with the gain obtained as the gain determination result. Hence, an accurate photoelectric conversion device 100 which can always appropriately read out pixel signals can be provided.

Note that the present invention is not limited to the aforementioned AF camera, but may be applied to various other apparatuses having a focus detection function.

In the first and second embodiments described above, the output from the peak detection circuit is used in gain determination. However, the present invention is not limited to this. For example, the peak and bottom values may be detected, and a peak-bottom signal obtained by calculating the difference between the peak and bottom values may be used.

In the second embodiment, the first embodiment may be modified to do gain determination immediately before a read when gain determination is disturbed for some reasons.

Note that "some reasons" are, for example:

the maximum accumulation time Etime is short;

when gain determination is made using a circuit for outputting a peak-bottom difference in place of the peak detection circuit, operation for ending accumulation is made since the peak output has exceeded a predetermined level; and so forth.

The sensors $16_1$ to $16_n$ in the sensor array blocks $2_1$ to $2_n$ may use any kinds of sensors such as CCDs, CMOS sensors, and the like.

Also, the RAMs $17_1$ to $17_n$ in the sensor array blocks $2_1$ to $2_n$ may use either digital memories or analog memories.

Third Embodiment

The third embodiment of the present invention will be described hereinafter. Prior to a description of the third embodiment, the principle of a focus detection device will be explained with the aid of FIGS. 11 to 15.

Figure 11:
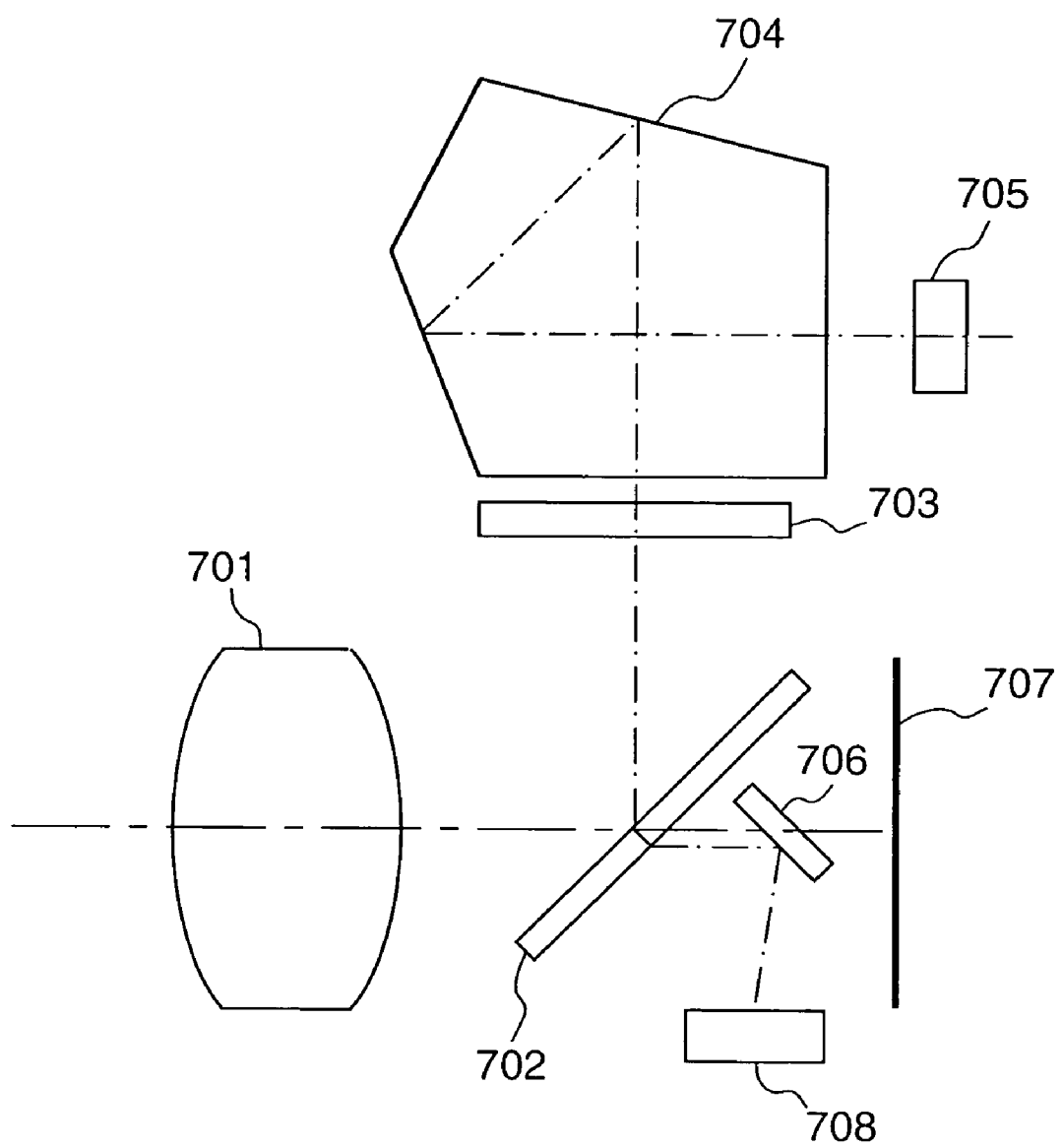
FIG. 11 is a view for explaining the principle of a focus detection device.

FIG. 11 shows the cross section of a camera including a focus detection device.

Referring to FIG. 11, reference numeral 701 denotes an objective lens for focusing light originating from an object to be photographed upon photographing; 702, a semi-transparent main mirror for reflecting light rays coming from the objective lens 701; 703, a focus plate placed at the focal point position of the objective lens 701; 704, a pentagonal prism for changing the light ray direction; 705, an eyepiece for the photographer; 706, a sub mirror which operates upon focus detection; 707, a film such as a silver halide film or the like; and 708, a focus detection device.

In FIG. 11, light coming from an object (not shown) is transmitted through the objective lens 701, and is reflected upward by the main mirror 702 to form an image on the focus plate 703. The image formed on the focus plate 703 is visually observed by the photographer or observer via the eyepiece 705 after being reflected several times by the pentagonal prism 704.

On the other hand, some light components of the light beam that has reached the main mirror 702 are transmitted through the main mirror 702, and are reflected downward by the sub mirror 706 toward the focus detection device 708.

Figure 12:
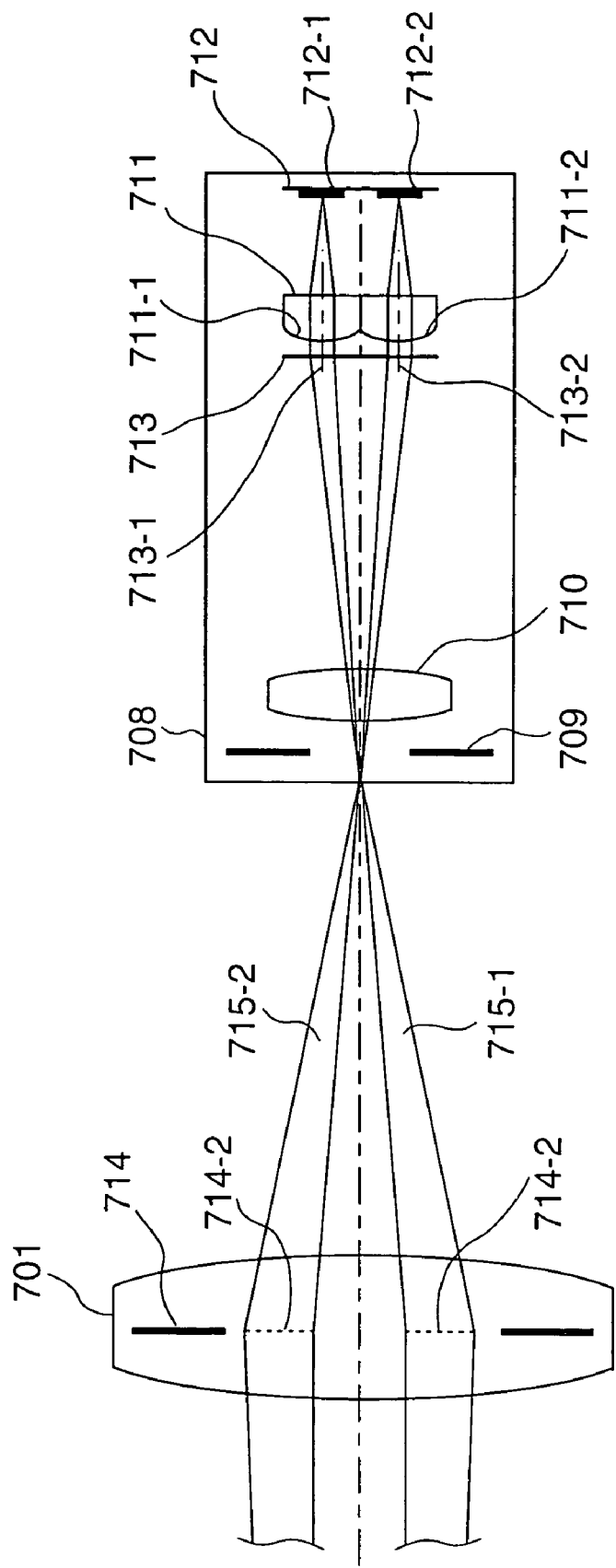
FIG. 12 is a view for explaining the principle of the focus detection device.

FIG. 12 is an exploded view of only the objective lens 701 and focus detection device 708 in FIG. 11 to explain the principle of focus detection.

In the focus detection device 708 shown in FIG. 12, reference numeral 709 denotes a field mask placed near the prospective focal plane of the objective lens 701, i.e., a plane conjugate with the film surface; 710, a field lens placed near the prospective focal plane; 711, a secondary imaging system built by two lenses 711-1 and 711-2; 712, a photoelectric conversion element including two sensor arrays 712-1 and 712-2 placed behind the two lenses 711-1 and 711-2 in correspondence with these lenses; 713, a stop having two apertures 713-1 and 713-2 formed in correspondence with the two lenses 711-1 and 711-2; and 714, the exit pupil of the objective lens 701, which includes two split zones 714-1 and 714-2.

Note that the field lens 710 has an effect of forming an image in the vicinity of the apertures 713-1 and 713-2 of the stop 713 with respect to the zones 714-1 and 714-2 of the exit pupil 714 of the objective lens 701, and light beams 715-1 and 715-2 transmitted through the two zones 714-1 and 714-2 of the exit pupil 714 form light amount distributions on the two sensor arrays 712-1 and 712-2, respectively.

The focus detection device shown in FIG. 12 is of so-called phase difference detection type, and will be described below with reference to the graphs of the light amount distributions formed on the sensor arrays 712-1 and 712-2 in FIGS. 13A to 13C.

Figure 13A:
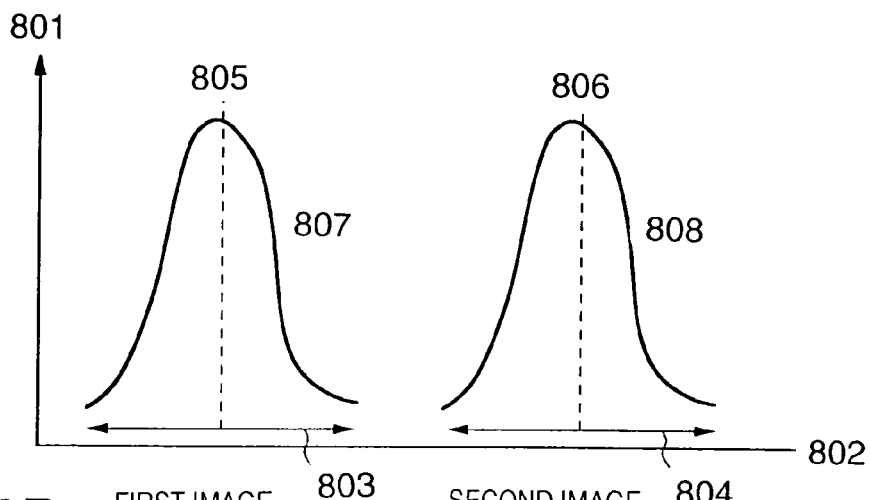
FIGS. 13A to 13C are graphs showing the light amount distributions of light that becomes incident on two sensors.

In FIG. 13A, reference numeral 801 denotes the ordinate of the graph, which plots the light amount intensity. Reference numeral 802 denotes the abscissa of the graph, which plots the distributions of pixels on the sensor arrays 712-1 and 712-2; and 807 and 808, the light intensity outputs (to be referred to as image signals hereinafter) of the pixels. Reference numerals 803 and 804 denote the distributions of the sensor arrays 712-1 and 712-2, which will be referred to as first and second images, respectively, for the sake of simplicity. Reference numerals 805 and 806 denote the central portions of the individual sensor arrays.

When the image point of the objective lens 701 agrees with the prospective focal plane, the first and second image outputs nearly match each other, as shown in the graph in FIG. 13A.

Figure 13B:
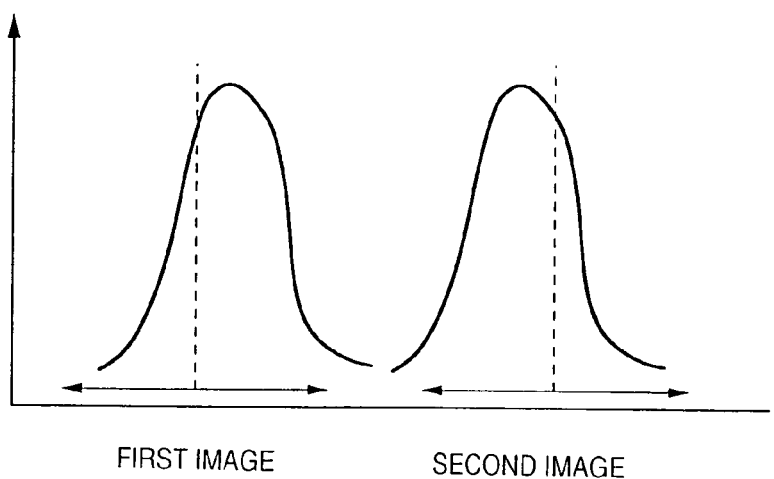
Figure 13C:
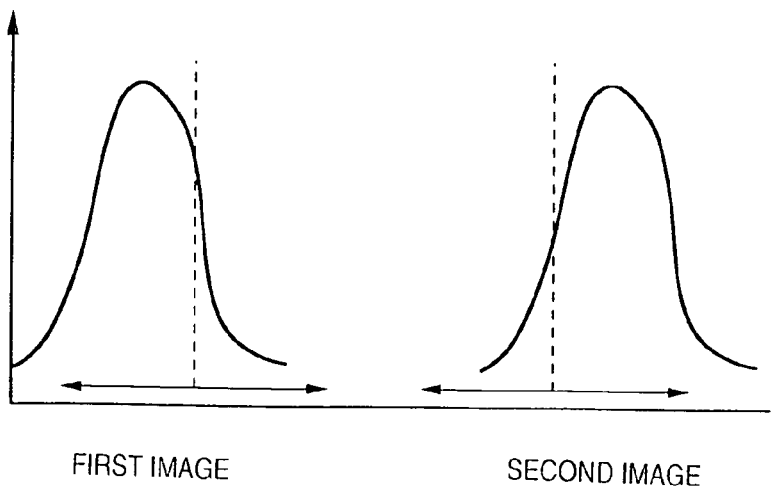

On the other hand, when the image point of the objective lens 701 is located in front of the prospective focal plane, i.e., when the image point is located on the objective lens 701 side, light amount distributions are formed on the two sensor arrays 712-1 and 712-2 close to each other, as shown in FIG. 13B. By contrast, when the image point of the objective lens 701 is located behind the prospective focal plane, light amount distributions are formed on the two sensor arrays 712-1 and 712-2 separate from each other, as shown in FIG. 13C.

In addition, since the deviation between the light amount distributions formed on the two sensor arrays 712-1 and 712-2 has a functional relationship with the defocus amount, i.e., out-of-focus amount of the objective lens 701, the out-of-focus direction and amount of the objective lens 701 can be detected by calculating that deviation using an appropriate arithmetic means. The position of the lens system including the objective lens 701 and the like is moved in correspondence with the detected direction and amount to make the deviation nearly zero, thus ending focus detection.

Normally, an image signal is obtained by analog-to-digital (A/D) converting analog outputs from the sensor, and is subjected to digital arithmetic processing by an arithmetic unit to perform the aforementioned defocus amount calculations. At this time, to accurately calculate the defocus amounts, it is necessary to execute the accumulation control on the sensor in an appropriate accumulation time, and to read out the analog outputs with an appropriate amplification factor (to be referred to as a gain hereinafter).

Figure 14A:
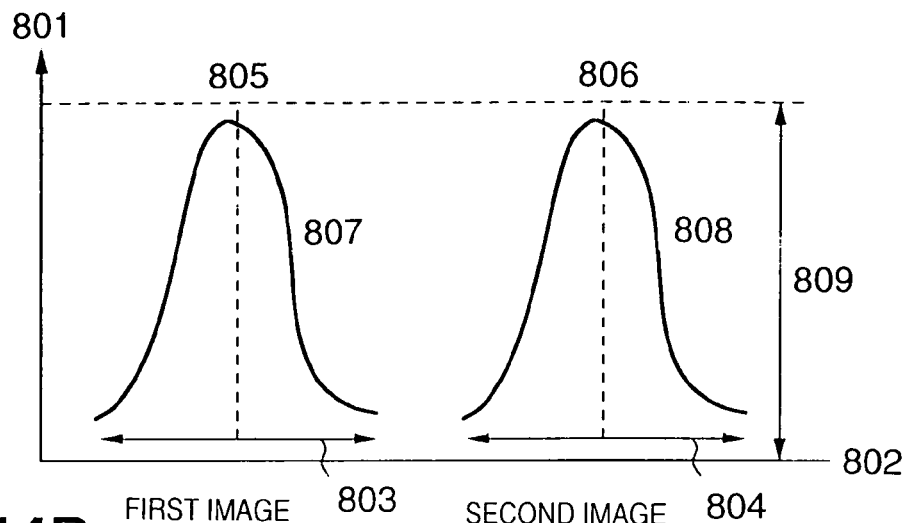
FIGS. 14A to 14C are graphs showing the relationship between the dynamic range of an A/D converter and the image signal.
Figure 14B:
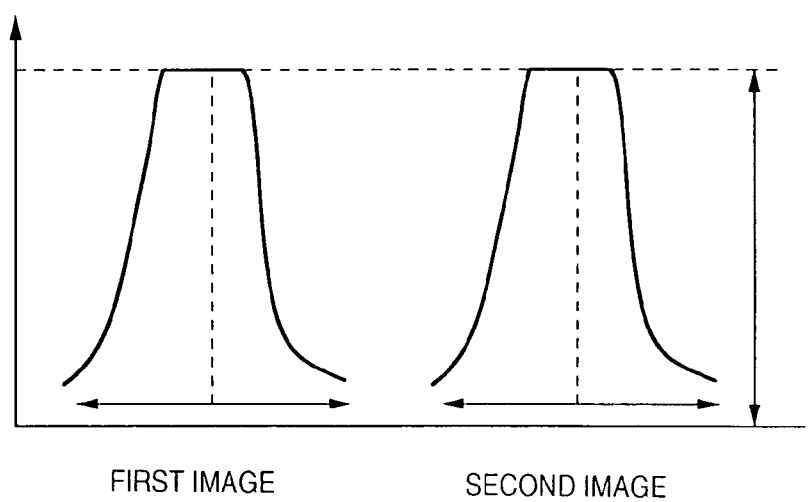
Figure 14C:
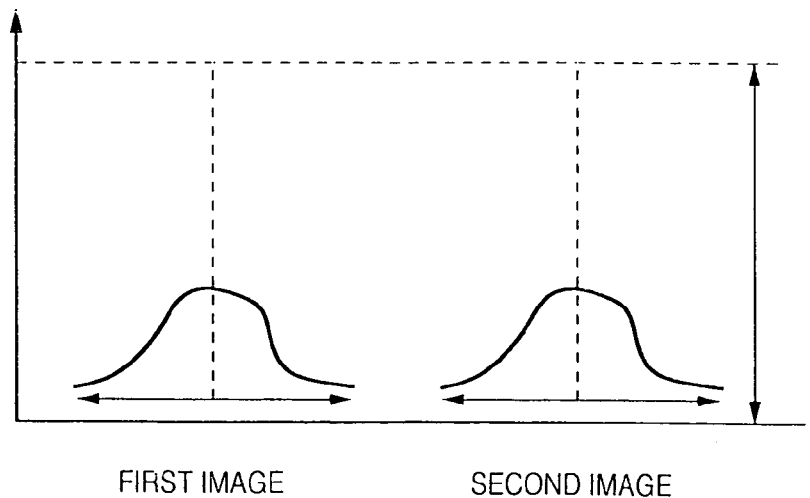
Figure 15:
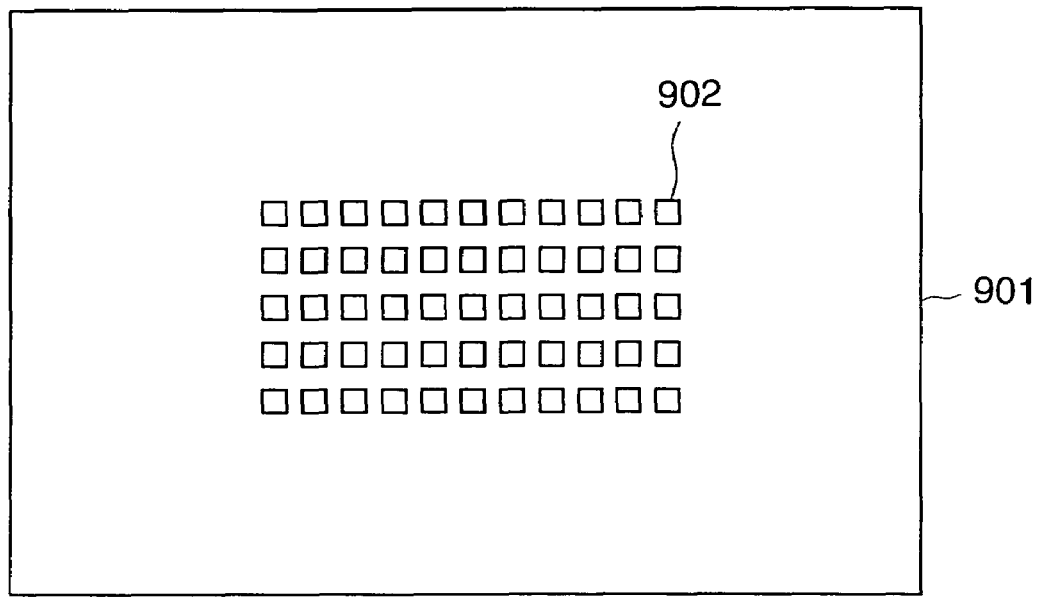
FIG. 15 is a view showing distance measurement points in a frame.

FIGS. 14A to 14C are graphs for explaining the image signal state that can improve precision.

In FIG. 14A, reference numeral 809 denotes the dynamic range of A/D conversion. When an image signal is read out, as shown in FIG. 14A, since nearly the entire dynamic range of A/D conversion is used, accurate defocus amount calculations can be attained even when noise components are slightly superposed on the image signal.

On the other hand, in FIG. 14B, the image signal exceeds the dynamic range of A/D conversion due to too long an accumulation time or too large a read gain. Hence, a high light-intensity portion of the image signal is lost as information used in calculation, and errors may be produced in the defocus amount calculations. By contrast, in FIG. 14C, the height of the image signal is very low due to too short an accumulation time or too small a read gain. In this state, the influence of noise superposed on the image signal cannot be ignored, and errors may be produced in the defocus amount calculations again.

Hence, to realize an accurate focus detection device, it is important to appropriately control the accumulation time and read gain.

The principle of the focus detection device has been described.

In a photoelectric conversion device and a focus detection device using the device according to the third embodiment of the present invention, a plurality of focus detection devices equivalent to the above-mentioned one are functionally present in a single camera. For example, even when 55 distance measurement points 902 are present in a frame 901 of an object image obtained by looking into the eyepiece 705 by the photographer (FIG. 15), focus detection can be done in the same principle.

Figure 16:
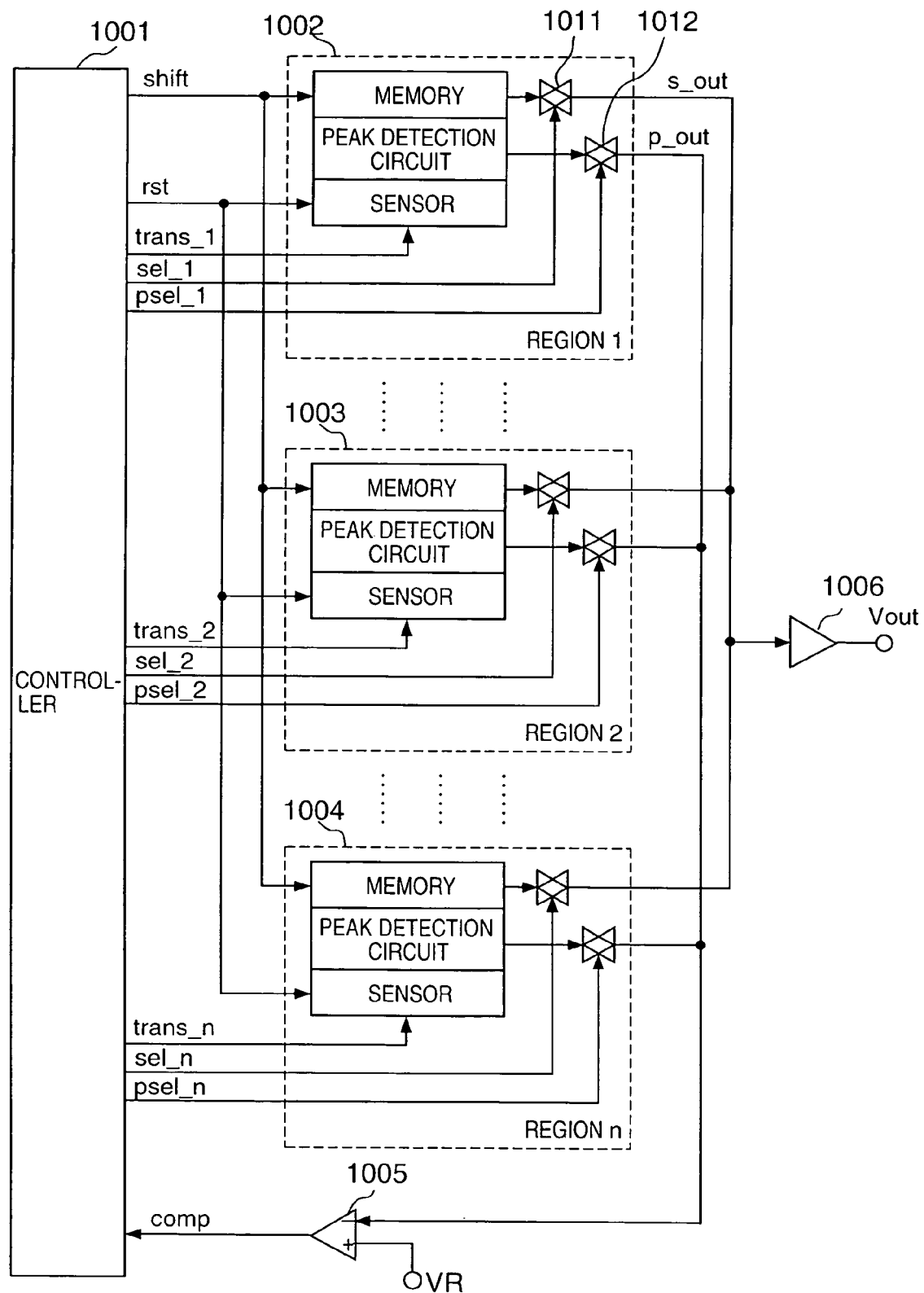
FIG. 16 is a block diagram showing the electric circuitry of the focus detection device.

FIG. 16 is a block diagram showing the electric circuit of the focus detection device 708.

Reference numeral 1001 denotes a controller, which performs accumulation control of a plurality of sensor arrays and read control of an image signal. Reference numerals 1002, 1003, and 1004 denote sensor array blocks corresponding to regions 1, 2, and n (n is an integer equal to or larger than 2), which respectively correspond to the distance measurement points 902 shown in FIG. 15.

In one sensor array block, a pair of sensor arrays for phase difference detection construct a sensor, and detect the first image by around 30 to 80 pixels, and the second image by the same number of pixels. Also, the sensor array block includes a peak detection circuit for detecting the highest output value among the pixels during accumulation, and a memory for temporarily storing photoelectric conversion outputs accumulated on the sensor simultaneously with the end of accumulation.

When an analog switch 1012 is ON, the peak detection circuit outputs the highest output value (p_out) among the pixels to one input terminal of a comparator 1005. The comparator 1005 compares a predetermined voltage VR with the signal p_out, and outputs a signal comp to the controller 1001. The comp signal="1" is output when the signal p_out is larger than VR, i.e., when accumulation is to end.

When an analog switch 1011 is ON, the memory sequentially outputs pixel outputs to the input terminal of a buffer amplifier 1006 in response to a signal shift from the controller 1001. The buffer amplifier 1006 outputs pixel signals with an appropriate gain via a terminal Vout.

When the controller 1001 outputs a signal rst (reset signal), charges on the sensors corresponding to all the regions 1 to n are cleared, thus starting accumulation control for all the regions. The controller outputs psel_1, psel_2, . . . in turn, and after it outputs psel_n for the n-th region as the last one, the controller 1001 outputs psel_1 again. Since the analog switch 1012 is turned on by the output signal psel_m (m=1 to n), peak signals (p_out) can be obtained in turn from regions 1 to n. The controller 1001 checks based on the signal comp if the peak signal (p_out) from the selected region has exceeded a predetermined level, thus attaining accumulation control, i.e., determining whether or not accumulation of that region is to continue.

If the signal comp is "1", the controller 1001 outputs a signal trans_m to stop sensor accumulation for that region, and transfers photoelectric conversion signals of the pixels accumulated on the sensor to the memory. If the signal comp is "0", the controller 1001 continues sensor accumulation without transferring signals. Of course, after signals have been transferred from a given region, that region is not subjected to transfer before the next accumulation.

After the signals are transferred to the memory, a region can be selected by a signal sel_m, and an image output can be read out in response to the signal shift.

First Embodiment

The first embodiment of the controller 1001 in FIG. 16 will be described in more detail with the aid of FIG. 17.

Reference numeral 1020 denotes a microcomputer (μCOM), which controls the entire electric circuit of the focus detection device 708 (see FIG. 12). Reference numeral 1021 denotes a clock generator for outputting clock signals (clk) at predetermined periods. Reference numeral 1022 denotes a counter for clearing its count value to zero upon reception of a reset signal (RST) from the microcomputer 1020, then counting up the signals clk from the clock generator 1021, and outputting its count value (cnt_value).

Reference numeral 1023 denotes an accumulation time memory for storing the accumulation times of the respective regions. Upon reception of the reset signal (RST) from the microcomputer 1020, all the contents of the memory are cleared to zero. Then, upon reception of a signal trans_m corresponding to each region from the microcomputer 1020, the memory 1023 stores cnt_value at that time in reg_m. In this way, the accumulation times of all the regions can be individually stored. The stored accumulation times are used for noise component correction and the like of an image signal, but since they are not directly related to the present invention, a detailed description thereof will be omitted. At least the sensor array blocks 1002 etc. and the accumulation time memory 1023 are arranged on the same semiconductor substrate.

Reference numeral 1024 denotes an input terminal of the signal comp output from the comparator 1005 shown in FIG. 16. As described above, the microcomputer 1020 determines based on the signal comp="0" or "1" if it outputs a signal trans_m.

Reference numeral 1025 denotes a signal rst to be output to the respective regions shown in FIG. 16. The signal rst is used for clearing charges on the sensors in FIG. 16 as well as the counter 1022 and accumulation time memory 1023 in FIG. 17.

Reference numerals 1026, 1028, and 1030 denote output terminals of signals trans_m output from the microcomputer 1020 to the sensors shown in FIG. 16. The signals trans_m are used for transferring photoelectrically converted charges from the sensors to the memories in FIG. 16 as well as the control of the accumulation time memory in FIG. 17.

Reference numerals 1027, 1029, and 1031 denote output terminals of signals psel_m output from the microcomputer 1020 to the analog switch 1012 shown in FIG. 16. These signals psel_m are used for selecting a region which supplies its output value to the comparator 1005 in FIG. 16.

The operation of the microcomputer 1020 will be described in more detail below with reference to the flow chart in FIG. 18.

If the operation is started in step S700, a signal rst is output (step S701) to clear the counter 1022 and accumulation time memory 1023, and also clear charges on the sensors for the respective regions, thus starting accumulation. Then, "0" is input to an internal register sel of the μCOM 1020. The register sel selects a region from which an image output is to be read out.

An internal register w_cnt of the μCOM 1020 is cleared to zero (step S702). The register w_cnt is counted up later and its contents are compared with a predetermined level to produce a wait time.

A signal clk is then input, and it is checked if the signal clk has risen from "0" to "1" (step S703). If YES in step S703, the flow advances to step S704; otherwise, the control stays step S703.

The count value (cnt_value) of the counter 1022 is input (step S704).

If it is determined in step S705 that the count value is smaller than a predetermined level c1, the flow directly advances to step S706 and the subsequent steps.

The register w_cnt is cleared to zero (step S706).

In step S707, the value of the register sel is incremented by 1. This operation can execute the accumulation control in turn in units of regions.

If the value of the register sel is larger than n, i.e., if it has exceeded the number of regions of the distance measurement points, "1" is input to the register sel to select region 1 again (steps S708 and S709).

If it is determined in step S708 that the value of the register sel is equal to or smaller than n, a signal psel_m is output (step S710). In response to this signal, the accumulation condition of region m, i.e., the peak value of the photoelectric conversion amounts of the pixels in region m appears as the output p_out.

If it is determined that region m has sufficiently accumulated charges, since the comparator 1005 outputs a signal comp="1" (step S711), the microcomputer 1020 outputs a signal trans_m to transfer charges on the respective pixels in the sensor of region m to the memory, thus ending accumulation (step S712). After that, the flow returns to step S702. On the other hand, if accumulation is insufficient, since a signal comp="0" is output, the flow directly returns to step S702.

On the other hand, if it is determined in step S705 that the count value (cnt_value) is equal to or larger than c1, the flow advances to step S713 to check if the value of the register w_cnt equals a predetermined value c2. If YES in step S713, the flow returns to step S706 to repeat the above-mentioned operations.

On the other hand, if it is determined in step S713 that the value of the register w_cnt has not reached c2 yet, the value of the register w_cnt is incremented by 1 in step S714, and the flow returns to step S703 to wait for the leading edge of the next signal clk.

In this fashion, in the third embodiment, since the cnt_value is small for a while after the beginning of the sensor accumulation, the flow quickly advances from step S705 to step S706 to continuously determine the accumulation amounts in units of regions 1 to n in turn in synchronism with the leading edge of the signal clk. When the cnt_value has exceeded the predetermined value c1 a certain period of time after the beginning of sensor accumulation, since determination of the accumulation amounts in units of regions is stopped unless the count value of the register w_cnt reaches the predetermined value c2, the drive frequency for determining the accumulation amount of the sensor lowers.

With this control, focus detection of a high-luminance object image can be accurately attained since an image signal can be formed without exceeding the dynamic range, and noise components and consumption currents can be minimized since the overall drive frequency lowers. To restate, according to this embodiment, an accurate, low-cost photoelectric conversion device which is easy to use due to many distance measurement points, and a focus detection device using the device can be realized.

Second Embodiment

Figure 18:
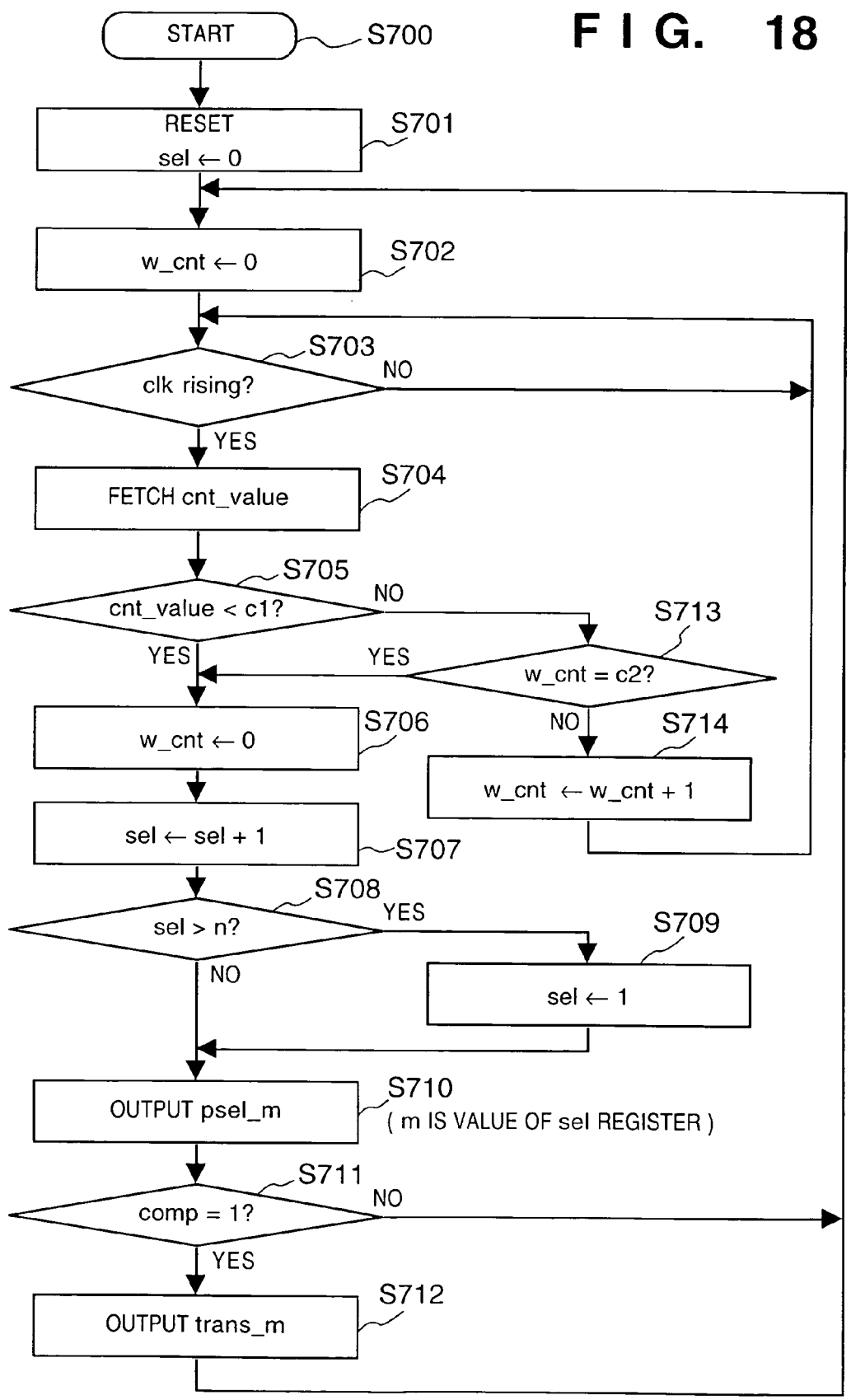
FIG. 18 is a flow chart for explaining the operation of the first embodiment.
Figure 19:
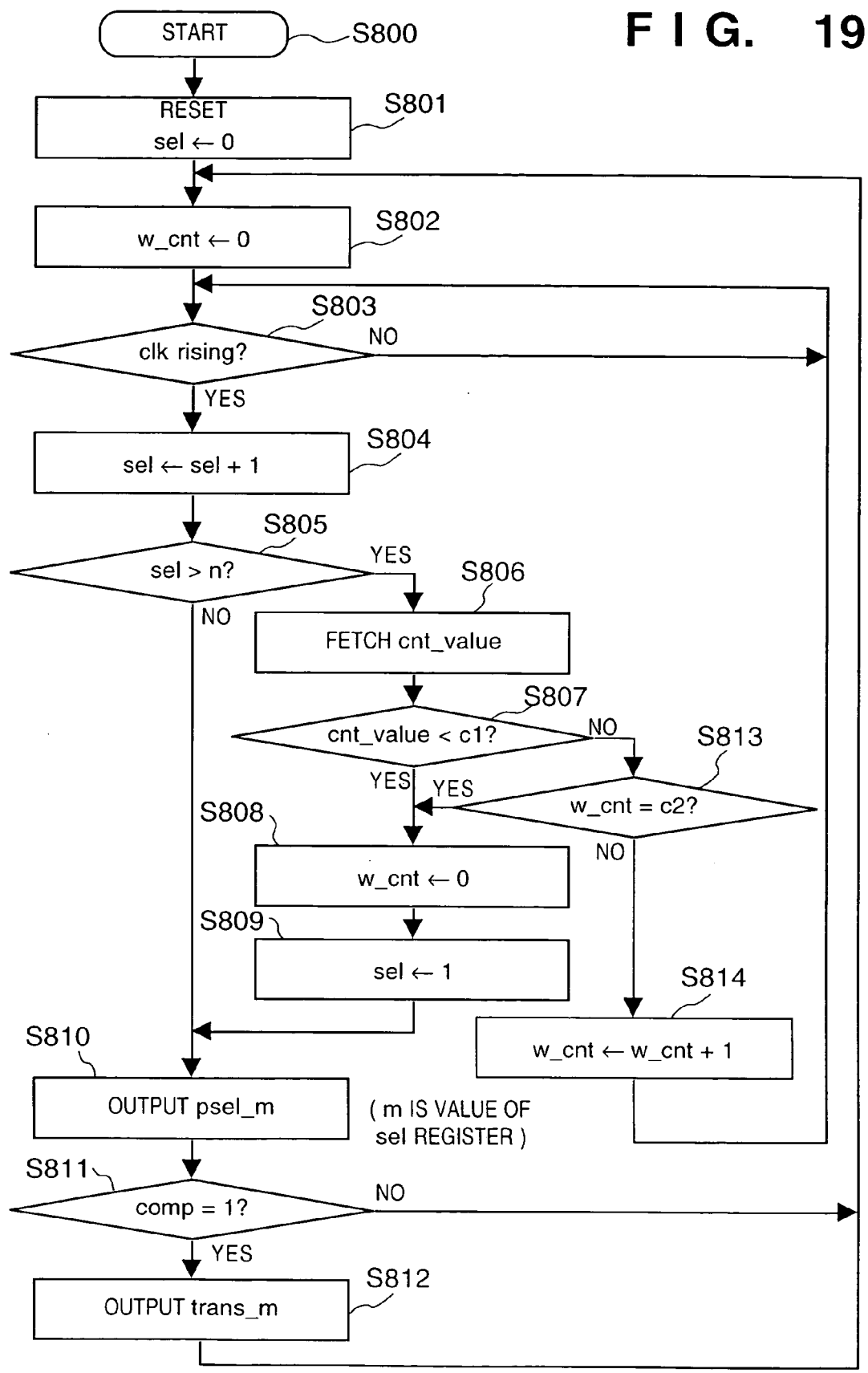
FIG. 19 is a flow chart for explaining the operation of the second embodiment.

In the second embodiment, the flow chart shown in FIG. 19 replaces that in FIG. 18 in the first embodiment.

The operation of the second embodiment will be described below with reference to FIG. 19.

Steps S800 to S803 are the same as steps S700 to S703.

In step S804, the value of the register sel is incremented by 1 as in step S707.

If the value of the register sel is equal to or smaller than n, the flow advances to step S810 and the subsequent steps; otherwise, the flow advances to step S806.

In step S806, the count value (cnt_value) of the counter 1022 is input.

If it is determined in step S807 that the count value is smaller than the predetermined level c1, the flow advances to step S808; otherwise, the flow advances to step S813 and the subsequent steps.

In step S808, the register w_cnt is cleared to zero.

In step S809, "1" is input to the register sel to select region 1 again.

Steps S810 to S812 are the same as steps S710 to S712.

If it is determined in step S807 that the count value is equal to or larger than c1, it is checked if the value of the register w_cnt has reached the predetermined value c2 (step S813). If YES in step S813, the flow returns to step S808 to repeat the above-mentioned operations.

If it is determined in step S813 that the value of the register w_cnt has not reached c2, the value of the register w_cnt is incremented by 1 in step S814, and the flow returns to step S803 to wait for the leading edge of the next signal clk.

In this way, in the second embodiment, the flow advances from step S807 to step S808 since the cnt_value is small for a while after the beginning of sensor accumulation to select region 1 soon again even when the control reaches the last region n, and the accumulation amounts are continuously determined in units of regions 1 to n in turn in synchronism with the leading edge of the signal clk. When the cnt_value has exceeded the predetermined value c1 a certain period of time after the beginning of sensor accumulation, the accumulation amounts of the respective regions are continuously determined from regions 1 to n in synchronism with the leading edge of the signal clk. However, upon completion of determination of the accumulation amount of the last region n, wait operation is inserted until the register w_cont is counted up to the predetermined value c2. This also lowers the drive frequency for determining the accumulation amount.

In the second embodiment, substantially the same effects as in the first embodiment can be obtained, and an accurate, low-cost photoelectric conversion device which is easy to use due to many distance measurement points, and a focus detection device using the device can be realized.

Third Embodiment

Figure 17:
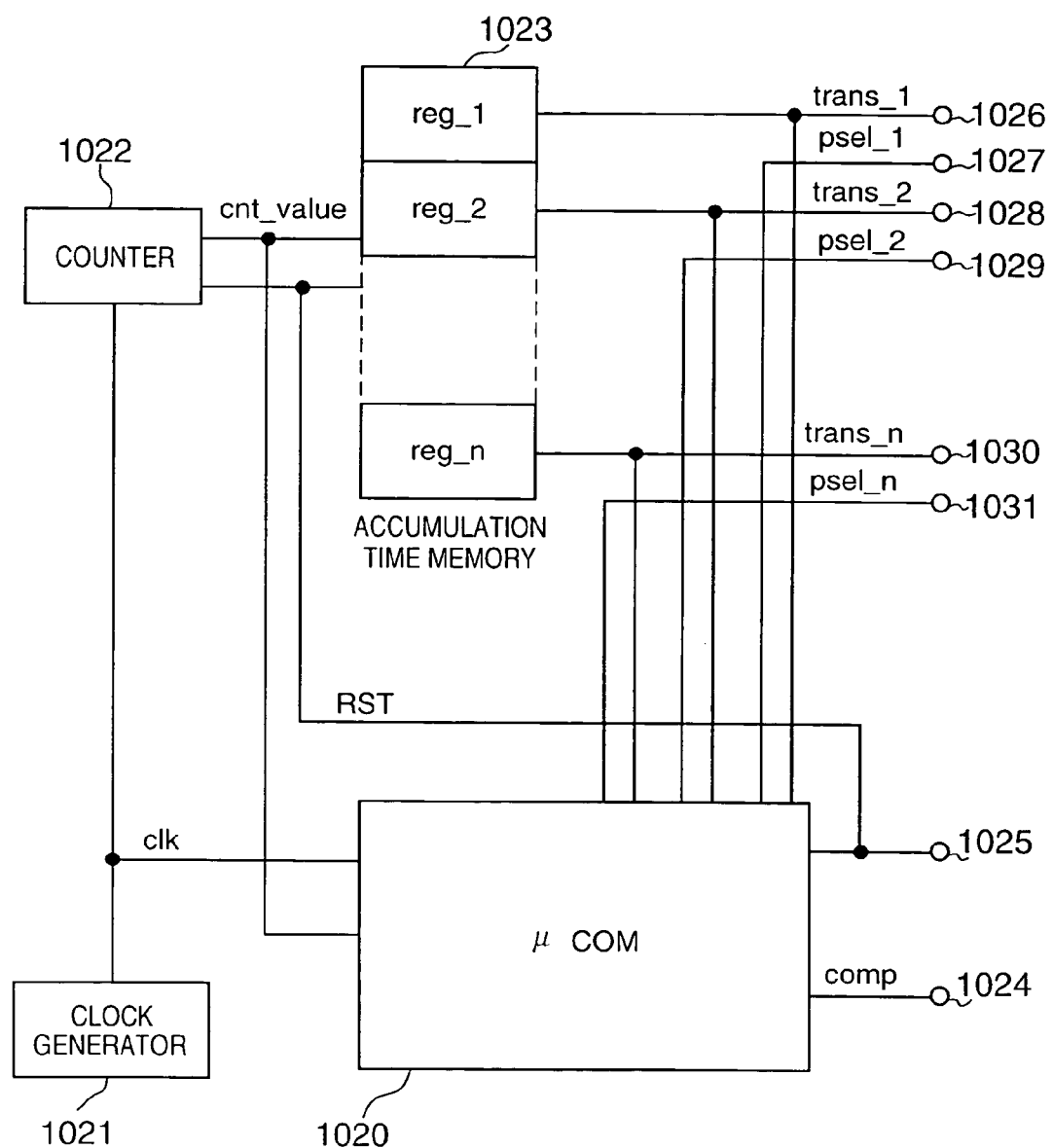
FIG. 17 is a block diagram showing the first embodiment of a controller shown in FIG. 16.
Figure 20:
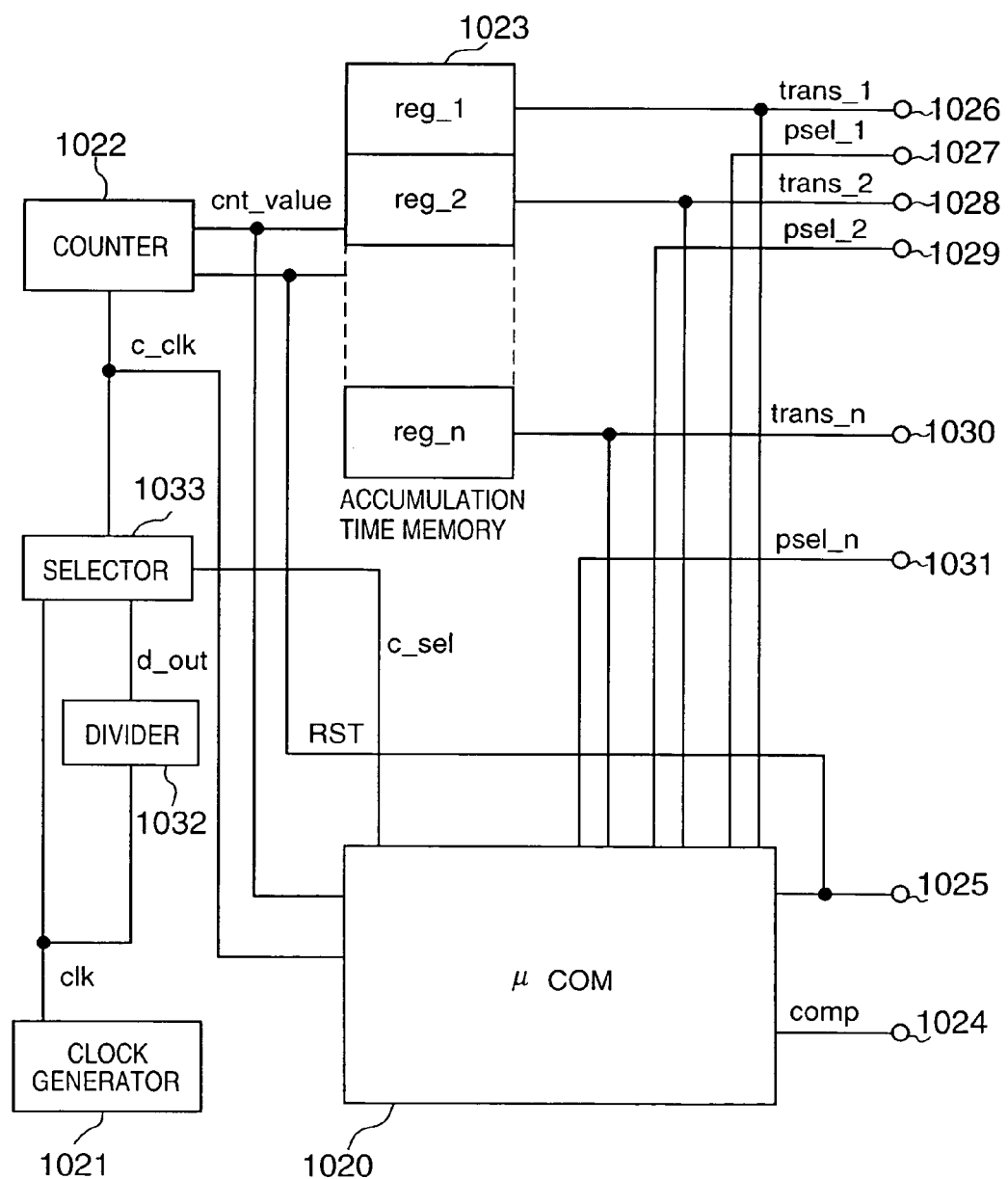
FIG. 20 is a block diagram showing another arrangement of the controller shown in FIG. 16.
Figure 21:
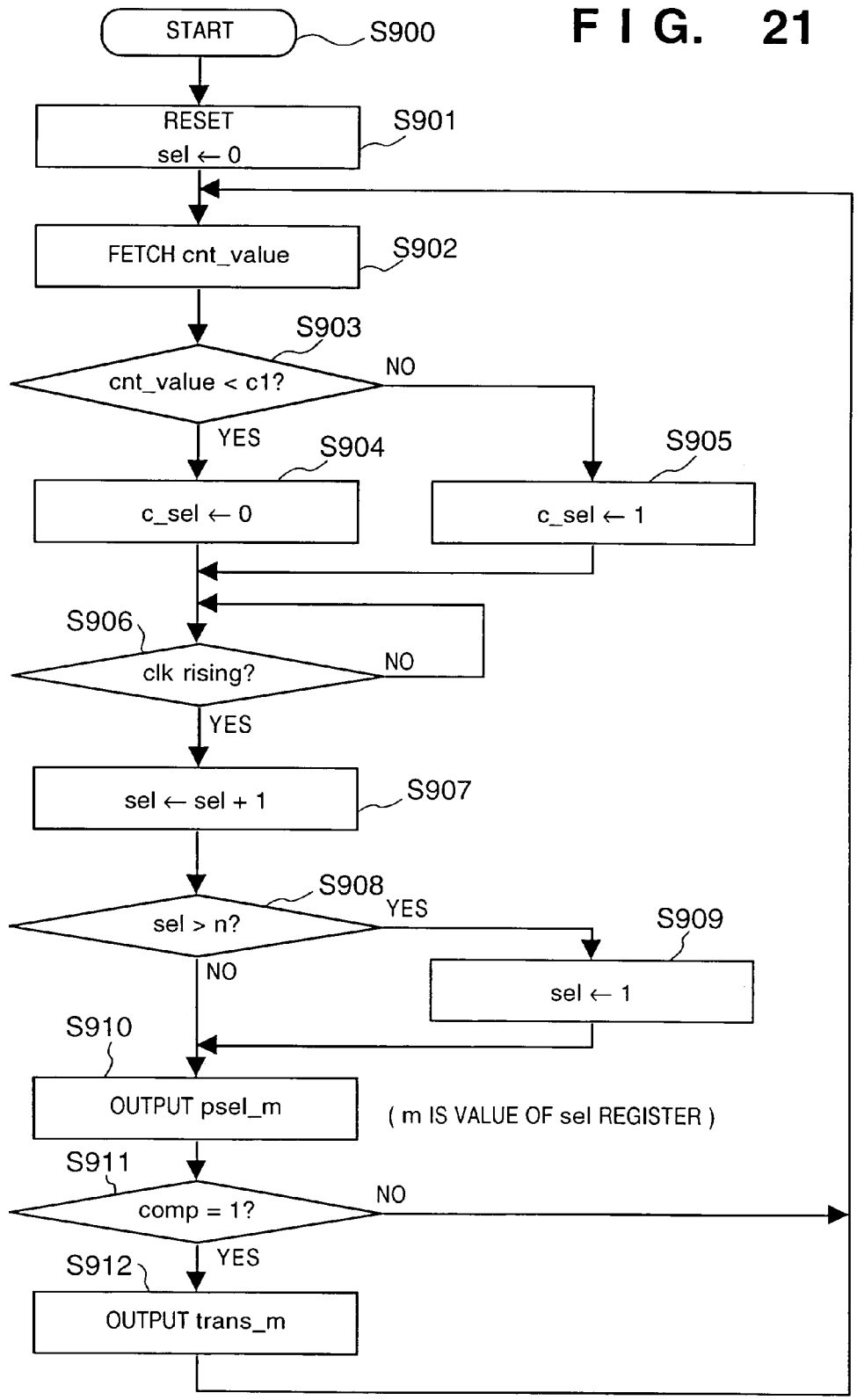
FIG. 21 is a flow chart for explaining the operation of the third embodiment.

In the third embodiment, the detailed block diagram of the controller 1001 of the first and second embodiments shown in FIG. 17 is modified as shown in FIG. 20, and the flow chart in FIG. 18 or 19 is modified as shown in FIG. 21.

The differences between FIGS. 20 and 17 will be explained below. Reference numeral 1032 denotes a divider for frequency-dividing a signal clk from the clock generator 1021 and outputting a signal d_out.

Reference numeral 1033 denotes a selector for selecting one of the signal clk from the clock generator and the signal d_out from the divider 1032 in accordance with a signal c_sel output from the microcomputer 1020, and outputting the selected signal as a signal c_clk. When c_sel=0, the signal clk is selected; when c_sel=1, the signal d_out is selected.

In FIG. 20, the signal c_clk output from the selector 1033 is input to the microcomputer 1020 and counter 1022 in place of the signal clk in FIG. 17.

The operation of the third embodiment will be described below with reference to the flow chart in FIG. 21.

Steps S900 and S901 are the same as steps S700 and S701.

In step S902, the count value (cnt_value) of the counter 1022 is input.

In steps S903 to S905, if the count value is smaller than the predetermined level c1, the output c_sel is set at "0"; if the count value is equal to or larger than c1, the output c_sel is set at "1".

The signal clk is then input and it is checked in step S906 if the signal clk has risen from "0" to "1". If YES in step S906, the flow advances to step S907; otherwise, the control stays step S906.

Steps S907 to S912 are the same as steps S707 to S712.

In this manner, in the third embodiment, since cnt_value is small for a while after the beginning of sensor accumulation, c_sel is set at "0", and the signal clk is selected as the output signal c_clk from the selector 1033. As a result, since the signal clk is input to both the microcomputer 1020 and counter 1022, regions for determining the accumulation amount are sequentially selected in synchronism with the signals with shorter periods from the clock generator 1021.

By contrast, when cnt_value has exceeded the predetermined value a given period of time after the beginning of accumulation, c_sel is set at "1", and the signal d_out is selected as the output signal c_clk from the sensor 1033. For this reason, the drive frequency of the accumulation control lowers. At the same time, the counter for the accumulation time counts up quickly for a while after the beginning of accumulation, but counting-up slows down soon.

The third embodiment can obtain substantially the same effects as in the first and second embodiments, and the flow chart can be simplified, thus reducing the load on software.

Note that the present invention may be applied to modifications or changes of the aforementioned embodiments without departing from the scope of the invention.

For example, in the above embodiments, the present invention is applied to a camera. However, the present invention is not limited to the camera but may be applied to various other apparatuses having a focus detection function. The drive frequency for determination of the accumulation amount is switched at a given timing after an elapse of a certain accumulation time, but the drive frequency may change continuously and gradually. The above embodiments use the phase difference detection scheme. However, the present invention is not limited to such specific scheme as long as an image signal is read out and is arithmetically processed.

Note that the plurality of photoelectric conversion elements correspond to sensors in the sensor array blocks 1002, 1003, and 1004 shown in FIG. 16, and the plurality of regions correspond to those of the sensor array blocks 1002, 1003, and 1004 shown in FIG. 16 and also to the distance measurement points 902 described above with reference to FIG. 15. The accumulation control means corresponds to the controller 1001 in FIG. 16 and signals psel_m, trans_m, and the like for driving the sensor array blocks 1002, 1003, and 1004, and has been explained by the processes in steps S710 to S712 in FIG. 18.

The accumulation start means corresponds to the signal rst in FIG. 16, the process in step S701 in FIG. 18, or the like.

The monitor means corresponds to the signal p_out in FIG. 16, and a determination means has been explained by the output comp from the comparator 1005 in FIG. 16, step S711 in FIG. 18, and the like.

The accumulation end means corresponds to signal trans_m in FIG. 16 and step S712 in FIG. 18.

Making the predetermined time interval immediately after the beginning of accumulation different from that a certain period of time after the beginning of accumulation has been explained in the flow chart in FIG. 18.

The objects of the present invention are also achieved by supplying a storage medium, which records a program code of a software program that can realize the functions of the host and terminal of the above-mentioned first to third embodiments to a system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned first and second embodiments may be realized not only by executing the readout program code by the computer but also by some or all of actual processing operations executed by an OS or the like running on the computer on the basis of an instruction of the program code.

Furthermore, the functions of the above-mentioned first and second embodiments may be realized by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the present invention, storage means (for example, a memory which can read and write information) corresponding to a photoelectric conversion element is used, and charge accumulation in the photoelectric conversion (start and end of charge accumulation, and the like), and the amplification factor (gain) upon reading out pixel signals are controlled on the basis of control information read out from the storage means. Hence, appropriate charge accumulation can always be done irrespective of the luminance levels of objects, and pixel signals can always be read out with an appropriate gain.

Especially, even when the number of distance measurement points is large in, e.g., a multi-point auto-focus camera, appropriate charge accumulation can always be done, and pixel signals can always be read out with an appropriate gain. In addition, the pixel signals can be read out by effectively using the dynamic range without impairing it. Hence, a low-cost device which can realize accurate auto-focus without increasing its circuit scale can be provided.

When the photoelectric conversion element and the corresponding storage means are integrally formed on a single substrate, control efficiency can be improved. Even when the number of distance measurement points is large, a lower-cost device which can improve operability without increasing the circuit scale can be provided. Since the drive frequency for accumulation control is switched between the timing immediately after beginning of accumulation and the timing a certain period of time after the beginning of accumulation, focus detection of even a high-luminance object image can be accurately done since an image signal can be formed without exceeding the dynamic range. Also, since the overall drive frequency lowers, noise components and consumption currents can be minimized. Hence, an accurate, low-cost photoelectric conversion device which is easy to use due to many distance measurement points, and a focus detection device using the device can be realized.

The present invention is not limited to the above embodiments and various changes and modifications can be made within the spirit and scope of the present invention. Therefore, to apprise the public of the scope of the present invention the following claims are made.

What is claimed is:

1. A photoelectric conversion device comprising:
a photoelectric converter including a plurality of photoelectric conversion elements each of which is constructed by a plurality of pixels on a semiconductor substrate;
a plurality of storage elements arranged on the same semiconductor substrate, each storing predetermined accumulation period control information employable in controlling a corresponding one of said photoelectric conversion elements, wherein each of said plurality of storage elements includes rewritable memory of which accumulation period control information employable in controlling an accumulation period of said photoelectric conversion element is rewritable by a predetermined program stored in a program memory; and
a controller, wherein said controller controls charge accumulation period of said photoelectric converter on the basis of the accumulation period control information stored in said storage elements.

2. The device according to claim 1, wherein said photoelectric converter further includes a monitor, wherein said monitor monitors an accumulated charge state in said photoelectric conversion element, and
said controller includes a selector, wherein said selector selects an arbitrary one of a plurality of pieces of status information on the basis of the accumulation period control information stored in said storage elements, and a comparator, wherein said comparator compares an output from said monitor with the status information selected by said selector, and controls the charge accumulation of said photoelectric converter on the basis of a comparison result of said comparator.

3. The device according to claim 2, wherein said monitor monitors and outputs information based on a maximum accumulated charge amount of said photoelectric conversion element.

4. The device according to claim 2, wherein said controller stores the status information selected by said selector in said storage elements as the accumulation period control information.

5. The device according to claim 1, wherein said photoelectric converter is constructed by forming said photoelectric conversion element and storage elements on a single substrate.

6. The device according to claim 2, wherein said controller includes a circuit, wherein said circuit determines predetermined information on the basis of said output from said monitor, and stores the information determined by said circuit in said storage elements as the accumulation period control information.

7. A method of controlling charge accumulation of a plurality of photoelectric conversion elements each of which is constructed by a plurality of pixels, comprising:
reading out respective accumulation period control information from a plurality of memories each of which is corresponding to respective one of said photoelectric conversion elements, and respectively controlling the charge accumulation period of each of said photoelectric conversion elements on the basis of respective accumulation period control information, wherein charge accumulation period of a plurality of photoelectric converters are controlled on the basis of accumulation period control information in a plurality of memories; and
rewriting respective accumulation period control information employable in controlling an accumulation period of said photoelectric conversion element in said plurality of memories by a program stored in a program memory.

8. The method according to claim 7, further comprising:
monitoring and outputting an accumulated charge state in said photoelectric conversion element;
selecting an arbitrary one of a plurality of pieces of status information on the basis of the accumulation period control information read out from said memory;
comparing the outputted accumulated charge state with the selected status information; and
controlling the charge accumulation of said photoelectric conversion element on the basis of a comparison result of said comparing.

9. The method according to claim 8, further comprising monitoring and outputting information based on a maximum accumulated charge amount of said photoelectric conversion element.

10. The method according to claim 8, further comprising storing the selected status information in said memory as the accumulation period control information.

11. The method according to claim 7, further comprising determining predetermined information on the basis of an accumulated charge signal read out from said photoelectric conversion element, and storing the determined information in said memory as the accumulation period control information.

12. A focus detection device including a photoelectric conversion device of claim 1.

13. A storage medium which computer-readably stores program code corresponding to a control method of claim 7.

* * * * *